United States Patent
van't Schip et al.

(10) Patent No.: US 10,677,315 B2
(45) Date of Patent: Jun. 9, 2020

(54) BELT SPLICING APPARATUS AND METHOD

(71) Applicant: Flexible Steel Lacing Company, Downers Grove, IL (US)

(72) Inventors: Joannes Stefanus van't Schip, Ionia, MI (US); Mark Steven Pettinga, Hudsonville, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 89 days.

(21) Appl. No.: 15/844,208

(22) Filed: Dec. 15, 2017

(65) Prior Publication Data
US 2018/0106326 A1 Apr. 19, 2018

Related U.S. Application Data

(63) Continuation of application No. 15/368,218, filed on Dec. 2, 2016, now Pat. No. 9,879,754.
(Continued)

(51) Int. Cl.
*F16G 3/10* (2006.01)
*F16G 3/16* (2006.01)
(Continued)

(52) U.S. Cl.
CPC ............... *F16G 3/16* (2013.01); *B29C 35/16* (2013.01); *B29C 65/18* (2013.01); *B29C 65/30* (2013.01);
(Continued)

(58) Field of Classification Search
CPC . B29C 66/4324; B29C 66/855; B29C 66/944; B29C 66/9441; F16G 3/10; F16G 3/16
See application file for complete search history.

(56) References Cited

U.S. PATENT DOCUMENTS 839,028 A 12/1906 Porter
1,459,822 A 6/1923 Carleton
(Continued)

FOREIGN PATENT DOCUMENTS

CA 1055666 A 6/1979
CA 2149061 A1 11/1995
(Continued)

OTHER PUBLICATIONS

Almex Group, Almexpad Junior, Aug. 14, 2013 (1 page).
(Continued)

*Primary Examiner* — Mark A Osele
(74) *Attorney, Agent, or Firm* — Fitch, Even, Tabin & Flannery LLP

(57) ABSTRACT

A portable conveyor belt splicing apparatus is provided that includes an upper press assembly and a lower press assembly which include, respectively, upper and lower platen assemblies. The upper and lower press assemblies may each include a forced air cooling system for rapidly cooling platens of the platen assemblies. The upper and lower press assemblies may include insulating assemblies with resilient members that support the upper and lower press assemblies. The resilient members provide structural support and insulate the platens from the frame which reduces the power required to heat the platens. In one form, the apparatus includes a power supply circuit that can alternate between providing power to upper and lower heaters in response to the apparatus being connected to different types of standard power supplies. Further, the power supply circuit permits the use of a single recipe for a particular belt irrespective of the type of power supply.

28 Claims, 35 Drawing Sheets

Related U.S. Application Data

(60) Provisional application No. 62/262,905, filed on Dec. 3, 2015.

(51) Int. Cl.
| | |
|---|---|
| *B29C 65/30* | (2006.01) |
| *B29D 29/06* | (2006.01) |
| *B29C 65/00* | (2006.01) |
| *F16G 3/00* | (2006.01) |
| *B29C 65/18* | (2006.01) |
| *B29C 35/16* | (2006.01) |
| *B29L 31/00* | (2006.01) |
| *B29K 101/12* | (2006.01) |
| *B29L 29/00* | (2006.01) |

(52) U.S. Cl.
CPC ........ *B29C 66/1142* (2013.01); *B29C 66/223* (2013.01); *B29C 66/3494* (2013.01); *B29C 66/43* (2013.01); *B29C 66/4322* (2013.01); *B29C 66/4324* (2013.01); *B29C 66/73921* (2013.01); *B29C 66/8161* (2013.01); *B29C 66/81451* (2013.01); *B29C 66/81811* (2013.01); *B29C 66/82421* (2013.01); *B29C 66/8322* (2013.01); *B29C 66/855* (2013.01); *B29C 66/861* (2013.01); *B29C 66/91212* (2013.01); *B29C 66/91216* (2013.01); *B29C 66/91231* (2013.01); *B29C 66/91443* (2013.01); *B29C 66/91951* (2013.01); *B29C 66/9441* (2013.01); *B29D 29/06* (2013.01); *F16G 3/003* (2013.01); *F16G 3/10* (2013.01); *B29C 66/71* (2013.01); *B29C 66/81453* (2013.01); *B29C 66/81812* (2013.01); *B29C 66/944* (2013.01); *B29C 66/961* (2013.01); *B29C 2035/1666* (2013.01); *B29K 2101/12* (2013.01); *B29L 2029/00* (2013.01); *B29L 2031/7092* (2013.01)

(56) References Cited

U.S. PATENT DOCUMENTS

| | | | |
|---|---|---|---|
| 2,248,499 | A | 7/1941 | Heintz |
| 2,566,262 | A | 8/1951 | Traxler |
| 2,725,091 | A | 11/1955 | Miner et al. |
| 3,547,743 | A | 12/1970 | Tunner |
| 3,969,051 | A | 7/1976 | Hovila |
| 3,986,765 | A | 10/1976 | Shaffer et al. |
| 3,994,767 | A | 11/1976 | Smith |
| 4,187,776 | A | 2/1980 | Schroder |
| 4,193,341 | A | 3/1980 | Clements et al. |
| 4,346,287 | A | 8/1982 | Desloge |
| 4,393,766 | A | 7/1983 | Thies |
| 4,414,048 | A | 11/1983 | Kontz |
| 4,423,674 | A | 1/1984 | Thies |
| 4,430,146 | A | 2/1984 | Johnson |
| 4,623,419 | A * | 11/1986 | Price ............... B29C 66/71 100/211 |
| 4,781,787 | A | 11/1988 | Weissfloch et al. |
| 4,900,270 | A | 2/1990 | Edwards et al. |
| 5,020,209 | A | 6/1991 | Fullard |
| 5,158,132 | A | 10/1992 | Guillemot |
| 5,329,094 | A | 7/1994 | Murphy et al. |
| 5,499,565 | A | 3/1996 | Hansen et al. |
| 5,562,796 | A | 10/1996 | Ertel |
| 5,714,738 | A | 2/1998 | Hauschulz et al. |
| 5,929,386 | A | 7/1999 | Hornick |
| 5,973,296 | A | 10/1999 | Juliano et al. |
| 6,002,103 | A | 12/1999 | Thommes |
| 6,086,806 | A | 7/2000 | Weatherall et al. |
| 6,109,977 | A | 8/2000 | Baxter et al. |
| 6,227,881 | B1 | 5/2001 | Tharp et al. |
| 6,228,200 | B1 | 5/2001 | Willis et al. |
| 6,233,398 | B1 | 5/2001 | Rutherford et al. |
| 6,234,304 | B1 | 5/2001 | DeGroot et al. |
| 6,263,158 | B1 | 7/2001 | Rutherford |
| 6,392,208 | B1 | 5/2002 | Arx |
| 6,433,317 | B1 | 8/2002 | Arx et al. |
| 6,434,328 | B2 | 8/2002 | Rutherford |
| 6,516,142 | B2 | 2/2003 | Grant et al. |
| 6,539,171 | B2 | 3/2003 | VonArx et al. |
| 6,692,614 | B2 | 2/2004 | Wright |
| 6,720,527 | B2 | 4/2004 | Gadamus et al. |
| 6,744,978 | B2 | 6/2004 | Tweedy et al. |
| 6,748,646 | B2 | 6/2004 | Von Arx et al. |
| 6,827,803 | B1 | 12/2004 | Willis |
| 7,049,523 | B2 | 5/2006 | Shuman et al. |
| 7,304,276 | B2 | 12/2007 | Lin et al. |
| 7,361,869 | B2 | 4/2008 | Russegger |
| 7,422,452 | B2 | 9/2008 | Achtner et al. |
| 7,465,901 | B2 | 12/2008 | Yunk et al. |
| 7,507,114 | B2 | 3/2009 | Kent et al. |
| 7,802,601 | B2 | 9/2010 | Marzona |
| 7,815,043 | B2 | 10/2010 | Hawkins et al. |
| 8,132,489 | B2 | 3/2012 | Zieger |
| 8,770,253 | B2 | 7/2014 | Zieger |
| 9,090,022 | B1 | 7/2015 | van't Schip |
| 9,360,084 | B2 | 6/2016 | Zieger |
| 9,701,063 | B2 | 7/2017 | Shaw |
| 9,879,754 | B2 | 1/2018 | van't Schip |
| 2001/0014212 | A1 | 8/2001 | Rutherford |
| 2002/0050445 | A1 | 5/2002 | Shaffer |
| 2002/0090209 | A1 | 7/2002 | VonArx et al. |
| 2003/0206804 | A1 | 11/2003 | Smith |
| 2004/0066665 | A1 | 4/2004 | Cheng |
| 2004/0139701 | A1 | 7/2004 | Cady |
| 2005/0098684 | A1 | 5/2005 | Gullerud et al. |
| 2006/0108354 | A1 | 5/2006 | Russegger |
| 2007/0090796 | A1 | 4/2007 | Norris |
| 2007/0108176 | A1 | 5/2007 | Ellis et al. |
| 2007/0119848 | A1 | 5/2007 | Ellis et al. |
| 2008/0012526 | A1 | 1/2008 | Sadow |
| 2008/0126292 | A1 | 5/2008 | Bhogal et al. |
| 2008/0135185 | A1 | 6/2008 | Marzona |
| 2009/0074544 | A1 | 3/2009 | Borner et al. |
| 2009/0179022 | A1 | 7/2009 | Ellis et al. |
| 2011/0067801 | A1 | 3/2011 | van't Schip |
| 2016/0089836 | A1 | 3/2016 | Shaw |
| 2017/0210057 | A1 * | 7/2017 | Hass ................. B29C 66/8227 |

FOREIGN PATENT DOCUMENTS

| | | |
|---|---|---|
| CN | 2918044 Y | 7/2007 |
| CN | 302030759 S | 8/2012 |
| CN | 202517722 U | 11/2012 |
| DE | 920478 | 11/1954 |
| DE | 927315 | 5/1955 |
| DE | 2304045 | 5/1974 |
| DE | 4417668 | 11/1995 |
| DE | 20100627 U1 | 5/2001 |
| EP | 1306579 A1 | 5/2003 |
| FR | 2785657 | 5/2000 |
| GB | 565475 | 11/1944 |
| JP | 62041442 | 2/1987 |
| JP | H11348124 | 12/1999 |
| JP | 2009257575 | 11/2009 |
| KR | 20120055074 A | 5/2012 |
| SU | 1612157 A1 | 12/1990 |
| WO | 2010012117 A1 | 2/2010 |
| WO | 2014172782 A1 | 10/2014 |
| WO | 2017096253 A1 | 6/2017 |

OTHER PUBLICATIONS

Almex Group, Conveyor Belt Vucanizers, 2014 (1 page).
Almex Group, Fabric Belt Splicing Tool Kit, Dec. 2011 (1 page).
Almex Group, Lightweight Portable Presses, Dec. 2011, (7 pages).
Almex Group, SVP Sectional Vulcanizing Press, Nov. 2011 (5 page).

(56) References Cited

OTHER PUBLICATIONS

Almex Group, Vortex Air Series, Air cooled Press Operating Manual, Dec. 18, 2013 (22 pages).
Almex Group, Vortex Air Series, Portable Press, Jul. 5, 2013 (1 page).
Almexgroup, Vortex Air Series Vulcanizing Press, Jun. 2013, (1 page).
Ammeraal Beltech, data sheet for Minimate 300, publicly available May 2001 (1 page).
Brochure for "Maestro Splicing Equipment" issued by Ammeraal Beltech Inc., Apr. 2008 (4 pages).
Brochure for "MPX An Almex Lightweight Product" issued by Shaw Almex Industries, Jan. 2009 (1 page).
Brochure for "Splice Press Series AERO 300-600-900-1200-1500" issued by Novitool TMC, Jan. 2009 (4 pages).
Continental Contitech, Installing and Splicing Textile Conveyor Belts, 2010 (29 pages).
Flexco, Novitool Aero Splice Press Safety and Operating Manual, copyright 2010 (23 pages).
Flexco, Novitool Aero Splice Press Safety and Operating Manual, copyright 2011 (23 pages).
Invitation to Pay Additional Search Fees and, Where Applicable, Protest Fee from the International Bureau of WIPO for International Application No. PCT/US2016/064757 dated Jan. 10, 2017 (2 pages).
Micronel AG, Miniature Radial Blower, 2001 (5 pages).
Notification of Transmittal of the International Search Report and the Written Opinion of the International Searching Authority, or the Declaration from the International Bureau of WIPO for International Application No. PCT/US2016/064757, dated Mar. 31, 2017 (11 pages).
Novitool TMC engineering drawings of SPP300A press, the press being publicly available more than one year before Dec. 3, 2015 (5 pages).
Novitool TMC, Operation Manual for SPP300A Splice Press, publicly available more than one year before Dec. 3, 2015 (3 pages).
Operation manual for "Splice Press Series AERO 300-600-900-1200-1500" issued by Novitool TMC, Jan. 2009 (15 pages).
Pictures of SPP300A Splice Press from Novitool TMC, publicly available more than one year before Dec. 3, 2015 (4 pages).
Chinese Patent Office, First Office Action dated Oct. 24, 2019, from related Chinese Patent Application No. 201680070959.X, 8 pages.
European Patent Office, Extended European Search Report dated Oct. 14, 2019, from related European Patent Application No. 16871633.0, 14 pages.

* cited by examiner

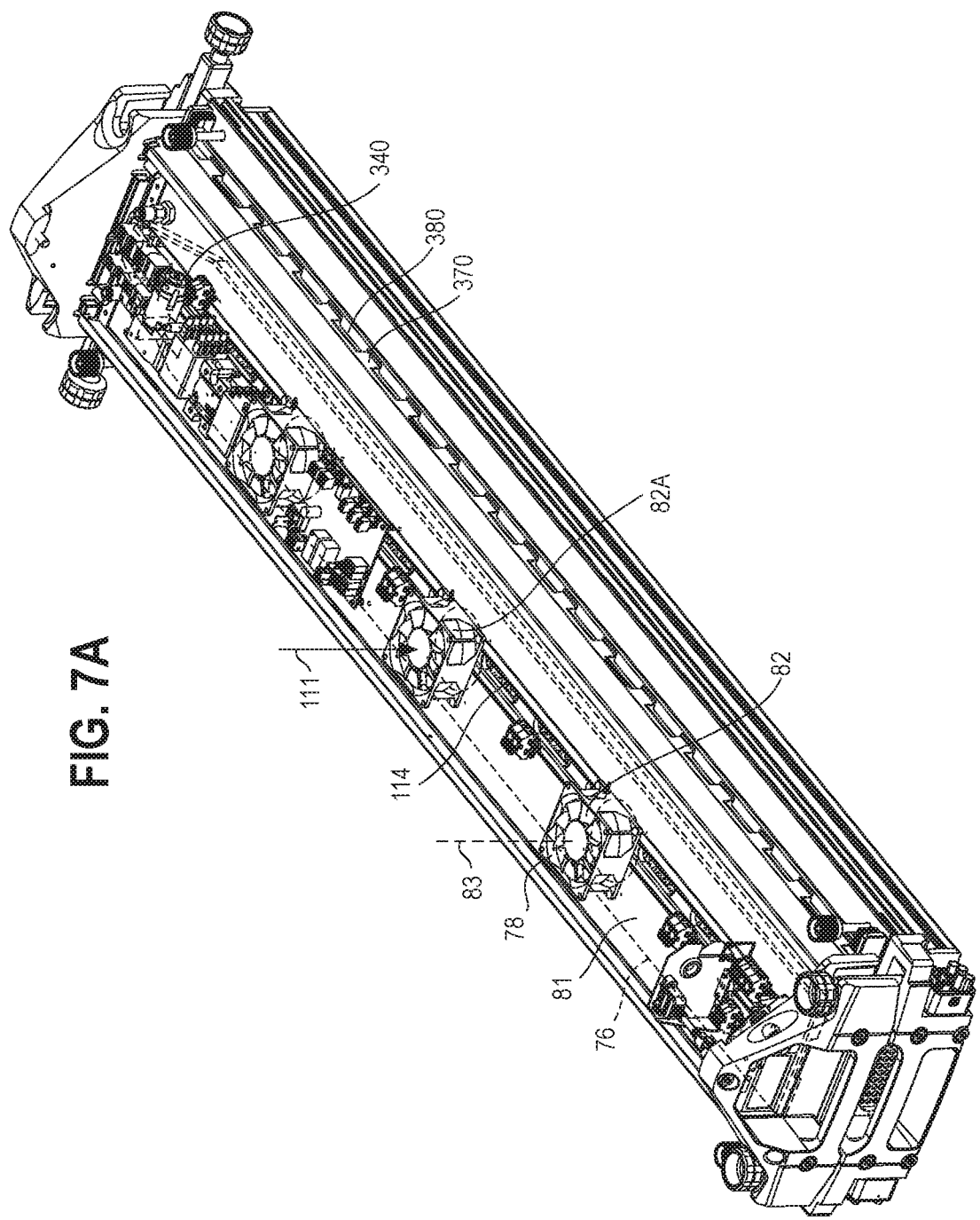

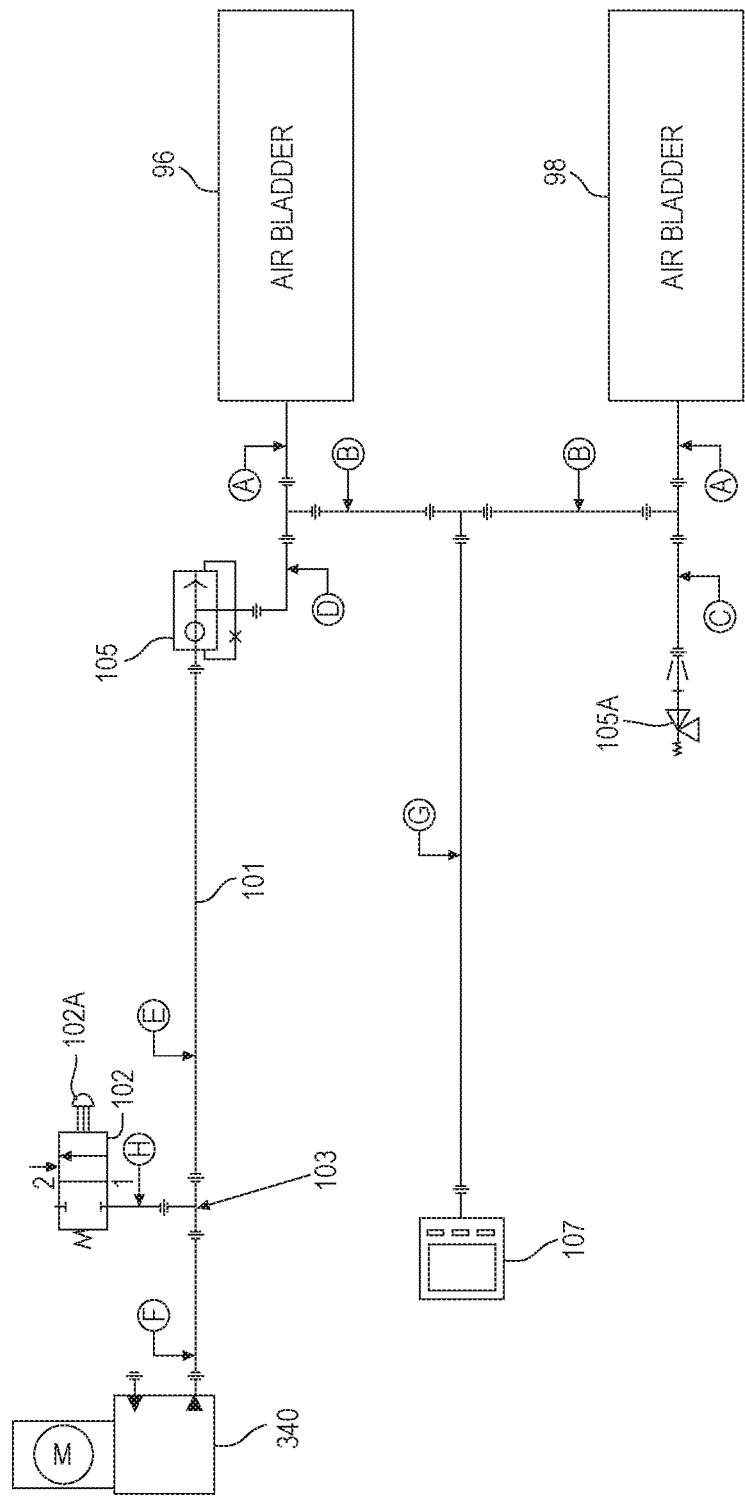

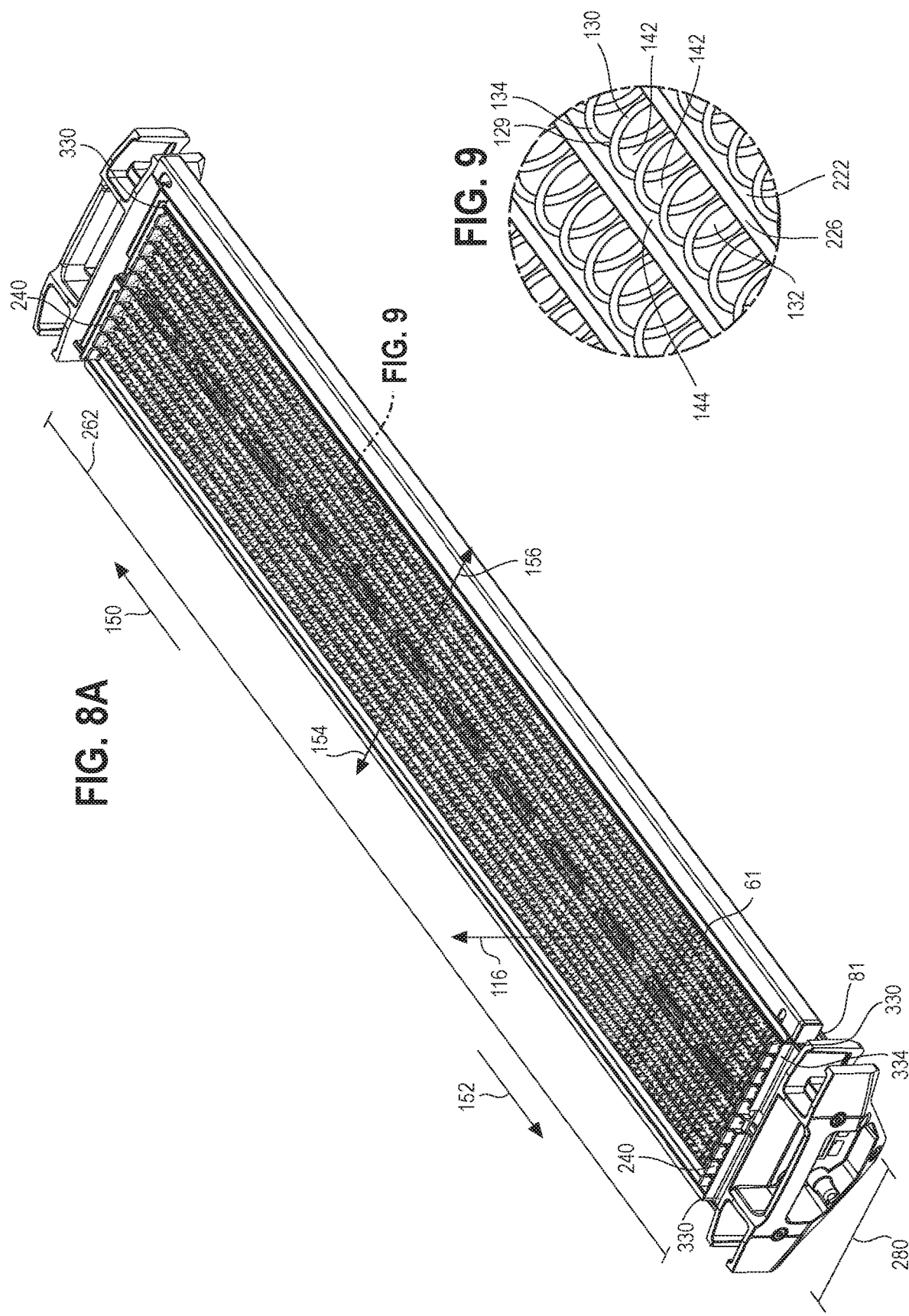

| Binary code | | | | Decimal | Assigned to cable |
|---|---|---|---|---|---|
| 1 | 1 | 1 | 1 | 15 | |
| | | | | | |
| 0 | 1 | 1 | 1 | 7 | 1ph 110V, 15A |
| 1 | 0 | 1 | 1 | 11 | 1ph 110V, 20A |
| 1 | 1 | 0 | 1 | 13 | |
| 1 | 1 | 1 | 0 | 14 | |
| | | | | | |
| 0 | 0 | 1 | 1 | 3 | 1ph 230V, 10A |
| 0 | 1 | 0 | 1 | 5 | 1ph 230V, 16A |
| 0 | 1 | 1 | 0 | 6 | 1ph 230V, 30A |
| 1 | 0 | 0 | 1 | 9 | 3ph 230V, 16A |
| 1 | 0 | 1 | 0 | 10 | 3ph 400V +N, 16A |
| 1 | 1 | 0 | 0 | 12 | |
| | | | | | |
| 0 | 0 | 0 | 1 | 1 | 3ph 400V no N |
| 0 | 0 | 1 | 0 | 2 | 3ph 460V |
| 0 | 1 | 0 | 0 | 4 | |
| 1 | 0 | 0 | 0 | 8 | |
| | | | | | |
| 0 | 0 | 0 | 0 | 0 | No cable |

| Standard Power Supply | Presses 600 | 900 | 1200 | 1500 | 1800 | 2100 |
|---|---|---|---|---|---|---|
| 1ph 110V, 15A | par, alt | par, alt | X | X | X | X |
| 1ph 110V, 20A | par | par, alt | par, alt | X | X | X |
|  |  |  |  |  |  |  |
| 1ph 230V, 10A | ser, alt | ser, alt | ser, alt | X | X | X |
| 1ph 230V, 16A | ser | ser | ser, alt | par, alt | par, alt | par, alt |
| 1ph 230V, 30A | ser | ser | ser | par | par | par |
| 3ph 230V, 16A | ser | ser | ser | par, alt | par, alt | par, alt |
| 3ph 400V +N, 16A | ser | ser | ser | par | par | par |
|  |  |  |  |  |  |  |
| 3ph 400V no N | X | X | X | ser | ser | ser |
| 3ph 460V | X | X | X | ser | ser | ser |

| | |
|---|---|
| ser | heater elements put in series |
| par | heater elements put in parallel |
| alt | alternate heating upper and lower heaters during warm-up stage |

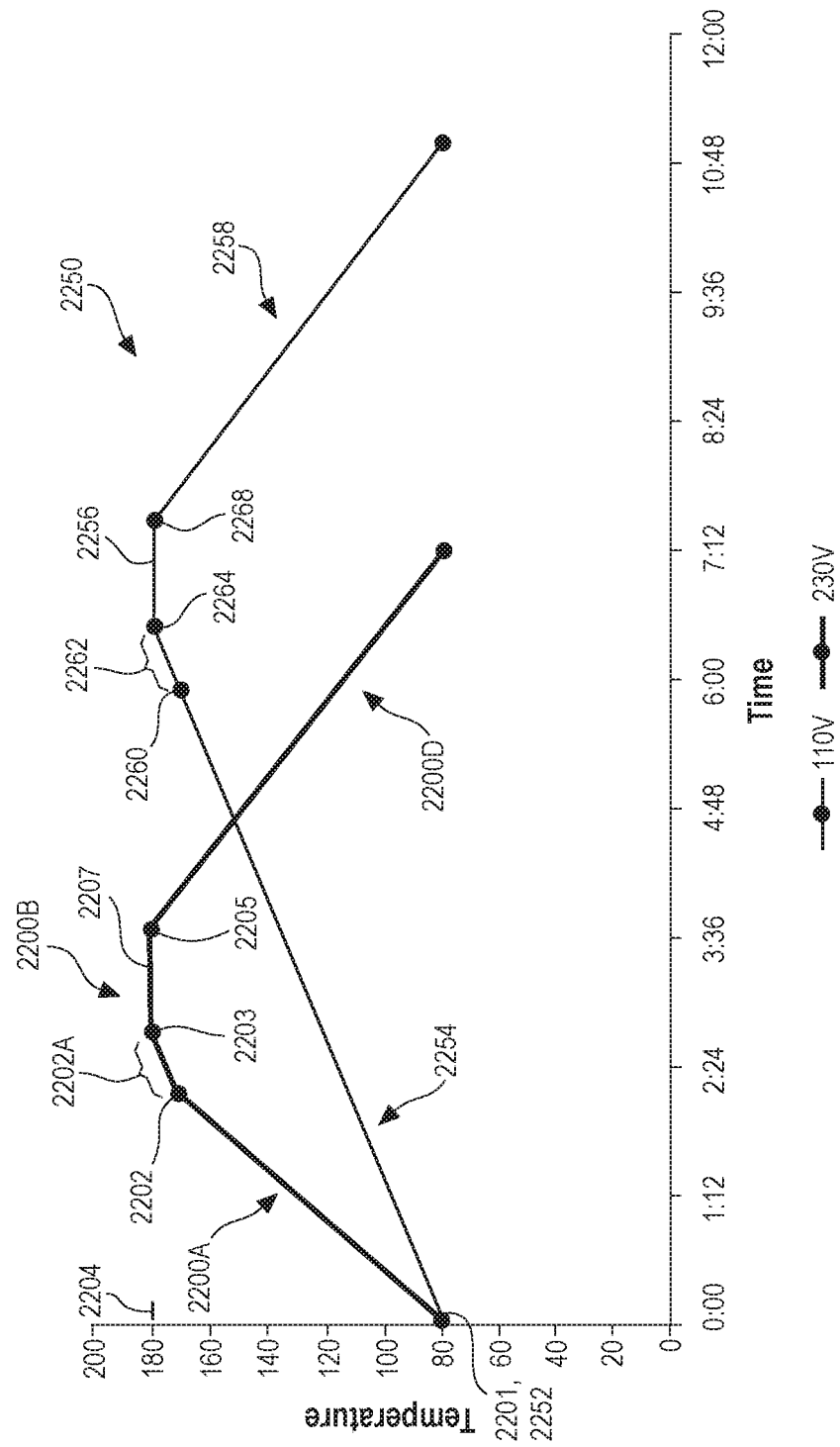

FIG. 25

| Voltage | 110V Single Phase | 230V Single Phase |
|---|---|---|
| preheat | no | no |
| top temp | 180 | 180 |
| bottom temp | 180 | 180 |
| Dwell | 1:00 | 1:00 |
| Pressure | 1.2 bar | 1.2 bar |
| Cool down temp | 80 | 80 |
| Starting Temp | 80 | 80 |

2222A

| Time Readings | | |
|---|---|---|
| | Low Power (110V) | High Power (230V) |
| heat up time (0-170) | 5:56 | 2:07 |
| heat up time (170-180) | 0:34 | 0:29 |
| Dwell Time | 1:00 | 1:00 |
| Cool Down Time | 3:35 | 3:36 |
| Total Time | 11:05 | 7:12 |

2222B

| Time Readings | | |
|---|---|---|
| | Cummulative Time | |
| Temp | Low Power (110V) | High Power (230V) |
| 80 | 0:00 | 0:00 |
| 170 | 5:56 | 2:07 |
| 180 | 6:30 | 2:36 |
| 180 | 7:30 | 3:36 |
| 80 | 11:05 | 7:12 |

2222C

BELT SPLICING APPARATUS AND METHOD

CROSS-REFERENCE TO RELATED APPLICATIONS

This application is a continuation of U.S. Non-Provisional patent application Ser. No. 15/368,218, filed Dec. 2, 2016, which claims the benefit of U.S. Provisional Patent Application No. 62/262,905, filed Dec. 3, 2015, which are hereby incorporated by reference in their entirety.

FIELD OF THE INVENTION

The invention relates to an apparatus for joining together two ends of a conveyor belt and, more particularly, to a portable splice press apparatus for joining together two ends of a conveyor belt.

BACKGROUND

Several industries utilize conveyor belts for transporting loads from one location to another location or for passing loads through successive processing operations. Many of these applications require conveyor belts that are able to maintain cleanliness under various and sometimes harsh conditions. For example, in the food and dairy industries, conveyor belts must provide sanitary surfaces for conveying food and dairy products to minimize the potential for contaminating these products. To meet this need, conveyor belt surfaces are often formed of materials, for example thermoplastic materials, that do not become easily contaminated when contacted with food or dairy products on the conveyor belt surface. To provide additional stability, light to medium duty conveyor belts used in these applications are typically formed in a plurality of plies, including one or more fabric layers sandwiched between thermoplastic or rubber layers. Thus, in the food product industry, for example, the conveying surface may be formed of a thermoplastic material that does not easily absorb liquid from conveyed food, while the carcass may be formed from a woven fabric to provide strength to the conveyor belt. In addition, in the food product industry and other industries, belts with uniform thicknesses and smooth continuous surfaces have greater strength, produce less wear on a conveyor system, and operate using smaller rollers than belts with non-uniform thicknesses or non-continuous surfaces.

During installation and maintenance of conveyor belts, the ends of one or more conveyor belts often must be joined together. While several existing methods and tools are capable of joining belt ends together, such as using adhesive or mechanical fasteners to adjoin the belt ends, welding is often the preferred method of joining the ends of conveyor belts, including light to medium duty polyvinyl chloride (PVC), polyurethane, and polyester belts, because it generally provides a more uniform and continuous joint and surface than other methods.

Welding ends of a conveyor belt together typically includes preparing the ends of the belt for splicing in a generally overlapping or intermeshing pattern, positioning the prepared belt ends together in a generally end-to-end orientation between a pair of heated plates, and subjecting the belt ends to specific temperatures and pressures applied by one or both of the plates for a specific amount of time to cause the material in the belt ends to melt or soften and flow together. Upon subsequently cooling the belt ends and releasing the pressure therefrom, the material will re-harden, fusing the material of the two belt ends to join the belt ends together. However, prior splice presses may have several deficiencies that limit usage of the splice presses.

Firstly, some prior splice presses are electrically inefficient. For example, some prior splice presses have thick metal platens, e.g., 20 mm thick, and a substantially rigid insulating member of heat insulating material between the platens of the splice press and the belt ends. This substantially rigid member may provide a more desirable heat distribution across the belt ends including a center hot zone and laterally outer cool zones.

Thick platens and an insulating member, however, increase the amount of mass that must be heated within the system because the entire thickness of the platens and the insulating member must be heated. Because more heat must be provided in order to sufficiently heat the belt ends, this additional heat must also be removed by the system prior to performing a subsequent splice, increasing the cycle time of the press for each belt splicing operation. Further, in some environments only relatively low voltage outlets, e.g., 110V, is available. There may simply not be sufficient power available to fully heat these prior splice presses because of the energy consumed in heating the thick platens and insulating member.

Another disadvantage of thick platens and a substantially rigid insulating member of prior splice presses is that they may increase the time required for heating the belt engaging surfaces of the splice press and for removing heat after the splice is formed. This delay decreases the ability of the user to quickly apply and remove heat from the belt ends. As a result, the quality of the splice may suffer because the quality of the splice depends on the temperature of the heated surfaces applied to the belt ends and the amount of time the belt ends are exposed to the temperature. For example, conveyor belt ends heated for too long of a duration may cause may undesirable amounts of material flow and/or degradation of the belt material. For a thermoplastic material belt with a fabric layer, this undesirable material flow could include bleeding of the thermoplastic material through the fabric layer of the belt which can create an area of high friction for the belt. Thus, the ability to quickly cool down the surfaces of the splice press can affect the resulting quality of the splice.

SUMMARY

In one aspect of the present disclosure, a portable conveyor belt splicing apparatus is provided for joining together ends of a conveyor belt. The portable conveyor belt splicing apparatus includes first and second press assemblies and elongated platens of the first and second press assemblies for being clamped on belt ends to longitudinally extend widthwise across conveyor belt ends. The portable conveyor belt splicing apparatus further includes heaters of the first and second press assemblies operable to heat the platens and at least one bladder of the first press assembly being inflatable to increase the clamping force applied to the belt ends by the platen of the first press assembly, the at least one bladder having a pair of opposite ends and extending longitudinally therebetween. The first press assembly also includes at least one first fan assembly of the first press assembly intermediate and spaced from the ends of the bladder for directing air past the bladder transverse to the longitudinal extent thereof and toward the platen of the first press assembly for cooling the platen.

In one form, the apparatus further comprises at least one second fan assembly of the second press assembly configured to direct air toward the platen of the second press assembly and cool the platen. In another form, the at least one bladder includes a pair of longitudinally extending bladders and the at least one fan assembly is configured to direct air past the bladders transverse to the longitudinal extents thereof.

In another aspect, a portable conveyor belt splicing apparatus is provided for joining conveyor belt ends together. The portable conveyor belt splicing apparatus includes upper and lower press assemblies and upper and lower platen assemblies of the upper and lower press assemblies. The apparatus includes a heater of one of the upper and lower platen assemblies of one of the upper and lower press assemblies. The one press assembly includes an insulating assembly having a plurality of resilient members of metallic material supporting the one platen assembly. In one form, the resilient members include coil springs.

The present disclosure also provides a conveyor belt splicing apparatus for joining ends of a conveyor belt. The conveyor belt splicing apparatus includes a housing including upper and lower housing portions having unclamped and clamped positions relative to ends of a conveyor belt. The upper and lower housing portions include upper and lower platens for being clamped on the belt ends with a clamping force with the upper and lower housing portions in the clamped position. The apparatus includes a heater associated with one of the housing portions for heating the platen thereof and at least one first bladder and at least one second bladder associated with the one housing portion and being inflatable to increase the clamping force the platen of the one housing portion applies against the belt ends. The apparatus includes a gap between the at least one first bladder and the at least one second bladder and at least one fan assembly associated with the one housing portion and arranged to direct airflow through the gap between the at least one first bladder and the at least one second bladder toward the platen of the one housing portion to cool the platen.

In another aspect of the present disclosure, a portable conveyor belt splicing apparatus is provided that includes upper and lower platens for clamping belt ends therebetween and upper and lower heaters operable to heat the upper and lower platens. The apparatus further includes a power supply circuit operably coupled to the upper and lower heaters for energizing the upper and lower heaters to splice the belt ends, the power supply circuit adapted to be electrically connected to either one of a high power standard power supply and a low power standard power supply. The power supply circuit is configured such that predetermined dwell characteristics for a belt splicing operation generated by the energized upper and lower heaters are the same regardless of whether the power supply circuit is connected to the high power standard power supply or the low power standard power supply.

In one form, the dwell characteristics include a dwell time such that the upper and lower platens are heated for a dwell time that is the same regardless of whether the power supply circuit is connected to the high power standard power supply or the low power standard power supply.

The dwell characteristics may include dwell temperatures for the upper and lower platens such that the upper and lower platens each have a dwell temperature that is the same regardless of whether the power supply circuit is connected to the high power standard power supply or the low power standard power supply.

In one form, the conveyor belt splicing apparatus further includes an air pump and at least one inflatable bladder connected to the air pump and the dwell characteristics include a dwell pressure. The power supply circuit is configured to control operation of the air pump to inflate the at least one bladder and apply the dwell pressure to the belt ends that is the same whether the power supply circuit is connected to the high power standard power supply or the low power standard power supply.

The power supply circuit of the conveyor belt splicing apparatus may be configured to operate the upper and lower heaters according to a first warm-up mode in response to the power supply being connected to the high power standard power supply. The power supply circuit may also be configured to operate the upper and lower heaters according to a second warm-up mode in response to the power supply being connected to the low power standard power supply. The second time period may be longer than the first time period.

In yet another form, the power supply circuit of the conveyor belt splicing apparatus is configured to alternate between providing more power to the upper heater than the lower heater and providing more power to the lower heater than the upper heater during a warm-up stage of a splicing operation in response to the power supply circuit being connected to the low power standard power supply. In one form, the power supply circuit is configured to provide more power to the upper heater than the lower heater by providing power to the upper heater and not providing power to the lower heater. The power supply circuit may also be configured to provide more power to the lower heater than the upper heater by providing power to the lower heater and not providing power to the upper heater.

In accordance with another aspect of the present disclosure, a method is provided for splicing ends of a conveyor belt between a pair of platens of a portable conveyor belt splicing apparatus. The method includes receiving electrical power at a power supply circuit of the conveyor belt splicing apparatus from either one of a high power standard power supply or a low power standard power supply. The method further includes energizing heaters operably coupled to the power supply circuit to heat the platens and splice the conveyor belt ends such that predetermined dwell characteristics generated by the heaters are the same regardless of whether the power supply circuit receives electrical power from the high power standard power supply or the low power standard power supply.

BRIEF DESCRIPTION OF THE DRAWINGS

FIG. 7A is a perspective view of the upper press assembly of FIG. 1 with portions of the upper press assembly removed to show fans oriented to direct air flow into the insulating assembly of the upper frame;

FIG. 7B is a schematic view of a pressure device of the upper press assembly of FIG. 1 showing the pair of inflatable bladders, a compressor for inflating the bladders, and a valve for releasing pressure from the bladders;

FIG. 8A is a bottom perspective view of the upper press assembly of FIG. 1 with the platen assembly removed to show the springs of the insulating assembly;

FIG. 9 is an enlarged view of the circled area in FIG. 8A showing air gaps between coils of the springs;

FIG. 22 is a table showing correspondence between a plurality of different power supply cords for connecting to different standard power supplies and binary codes provided by the different power supply cords;

FIG. 23 is a table providing a summary of different embodiments of the belt splicing apparatus and different modes of operation of the embodiments according to different standard power supplies;

FIG. 24 are graphs showing an average temperature of the platens of the conveyor belt splicing apparatus of FIG. 1 in Celsius during a splicing operation when a power supply cord of the apparatus is connected to a lower power standard power supply and when the power supply cord is connected to a higher power standard power supply;

FIG. 25 is a table of data corresponding to the graphs of FIG. 24;

DETAILED DESCRIPTION

Figure 1:
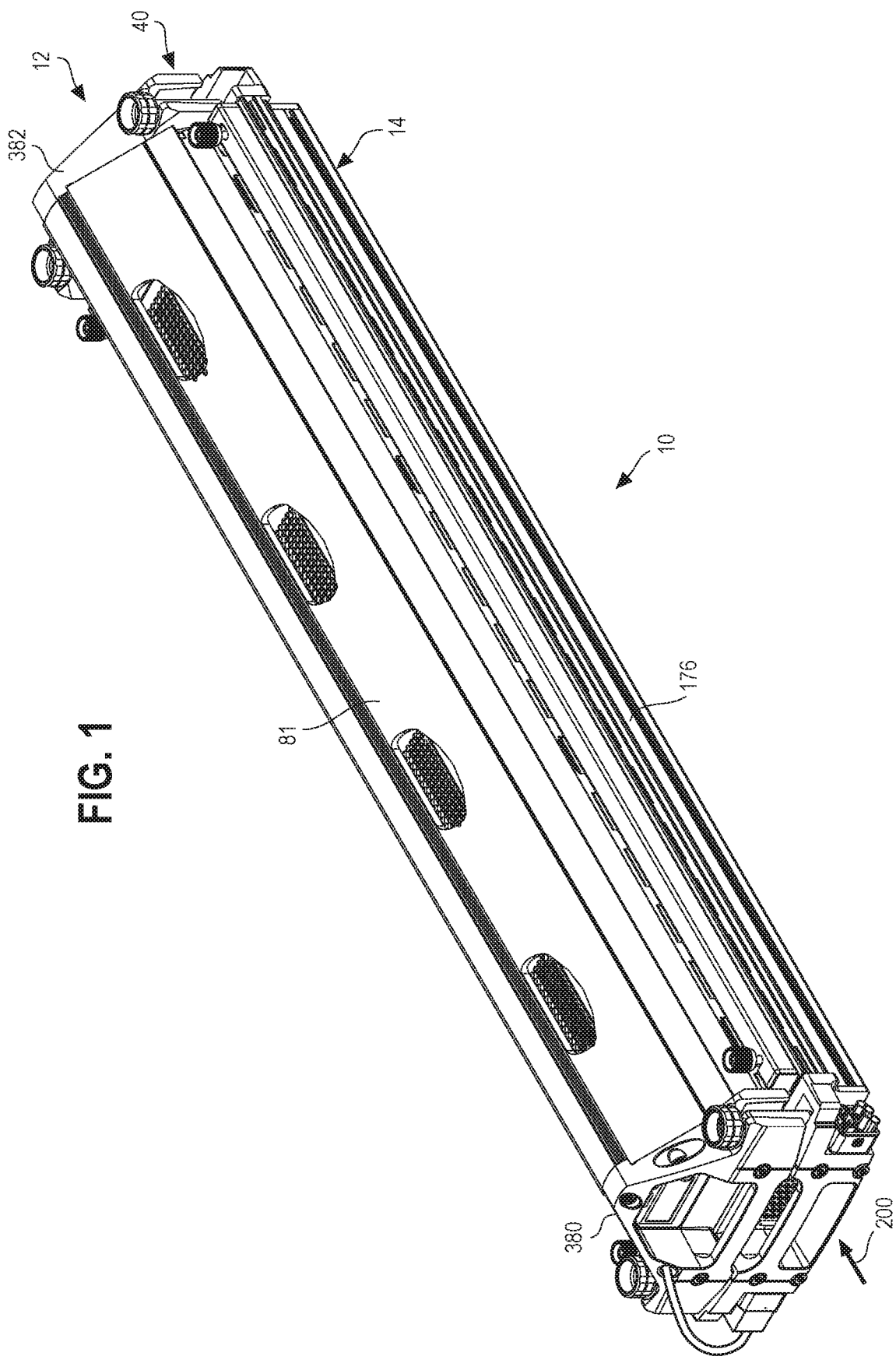
FIG. 1 is a perspective view of a conveyor belt splicing apparatus in accordance with one form showing an upper press assembly and a lower press assembly in a clamped or operative position.
Figure 2:
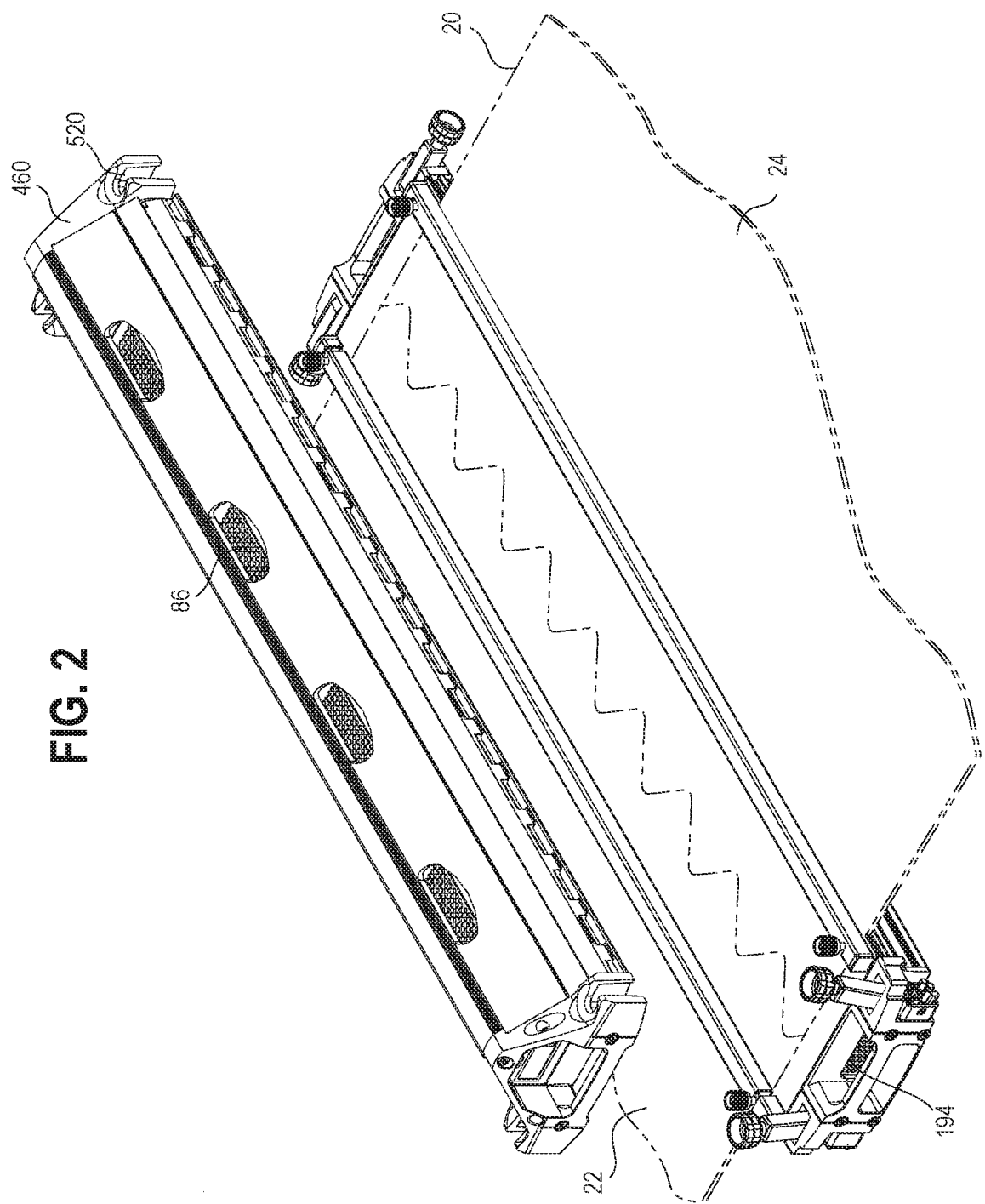
FIG. 2 is a perspective view of the conveyor belt splicing apparatus of FIG. 1 in an unclamped configuration with the upper press assembly above the lower press assembly and conveyor belt ends positioned therebetween.
Figure 4:
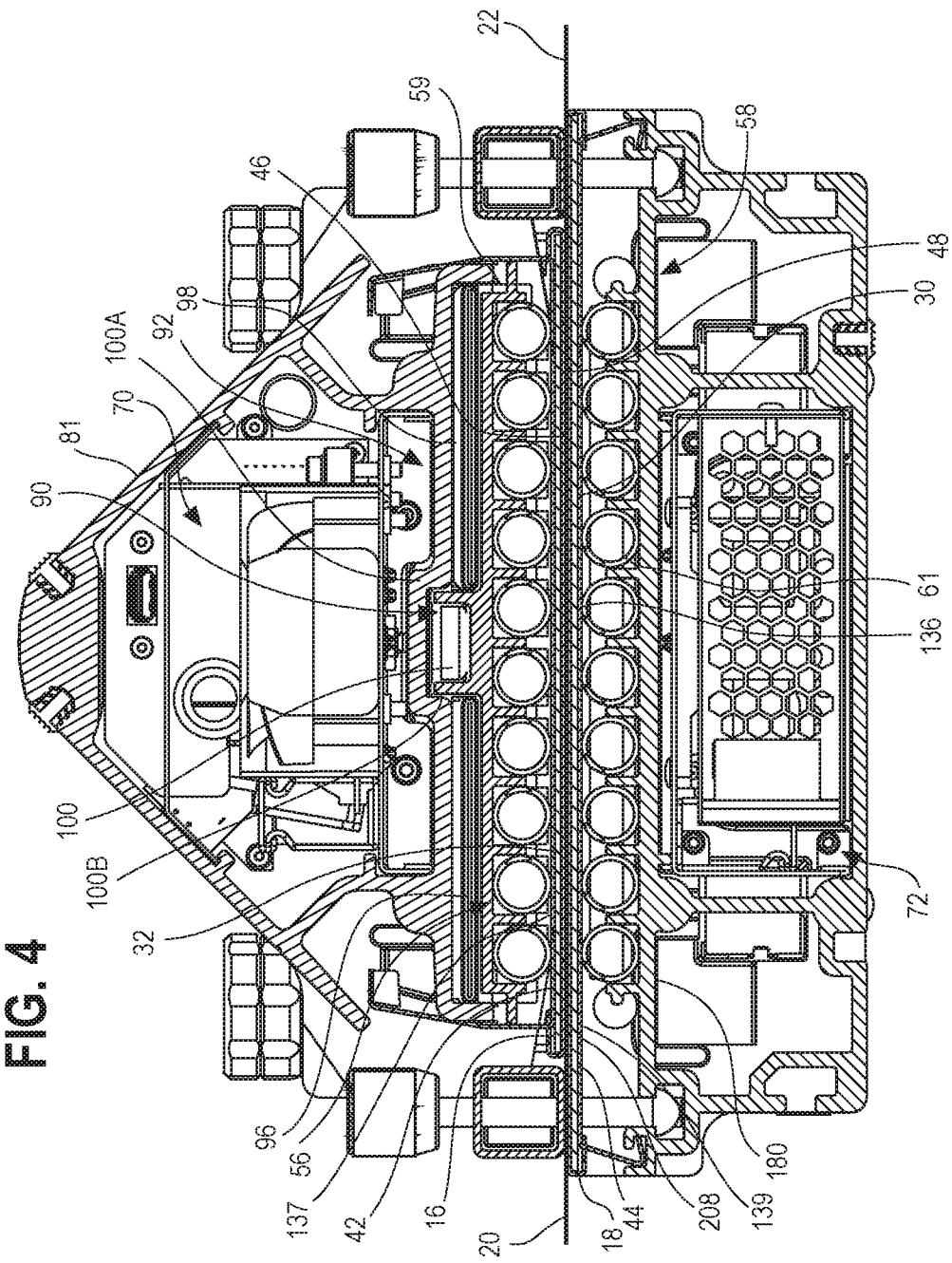
FIG. 4 is a cross-sectional view taken across line 4-4 in FIG. 3 showing a platen assembly and an insulating assembly of each of the upper and lower press assemblies.

In FIGS. 1 and 2, a portable belt splicing apparatus such as splice press 10 is provided for joining ends 20, 22 of a conveyor belt 24. The splice press 10 includes upper and lower press assemblies 12 and 14 that include corresponding oppositely facing upper and lower platen assemblies 16, 18. As shown in FIG. 4, the upper and lower platen assemblies 16, 18 include upper and lower platens 46, 48 and heaters 42, 44 configured to heat the platens 46, 48. The splice press 10 has an on-board control system, such as a power supply circuit 50 (see FIG. 21C), which can be coupled to different power supplies and provides sufficient power to the heaters 42, 44 and heat the platens 46, 48 to cause the material of the conveyor belt ends 20, 22 to begin to melt even when the power supply available to the splice press 10 is limited, such as 110 volt 15 amp; 110 volt, 20 amp; and 230 volt, 10 amp power supplies.

With reference to FIG. 4, one or both of the upper and lower press assemblies 12, 14 have insulating assemblies 56, 58 which increase the efficiency of the platens 46, 48 by resisting heat loss away from the platens 46, 48. Stated differently, the insulating assemblies 56, 58 keep the heat generated by the heaters 42, 44 at the platens 46, 48. This permits the platens 46, 48 to be sufficiently heated even when the power available to the power supply circuit 50 is relatively low. Further, the insulating assemblies 56, 58 may decrease the duration of heat application to the conveyor belt ends 20, 22 which improves splice quality.

In one form, the insulating assemblies 56, 58 reduce heat transfer from the upper and lower platen assemblies 16, 18 by using standing air as an insulator and minimizing the surface area of material of the insulating assemblies 56, 58 that contacts the platen assemblies 16, 18. With reference to FIGS. 8A and 9, the insulating assemblies include resilient support members, such as coil springs 61, which include a plurality of coils 129, each having a curved portion 130 that extends around a center 132 of the springs 61. By resilient, it is intended to mean that the coil springs 61 are able to elastically deform during typical operation of the splice press 10. The curved portions 130 include outer surfaces 134 that each form a point contact 136 with the platen assemblies 16, 18 as shown in FIG. 4. More specifically, the outer surfaces 134 may be rounded and contact generally flat support plates 137, 139 of the upper and lower platen assemblies 16, 18. By utilizing point contacts, the area for conduction between the platen assemblies 16, 18 and the springs 61 is minimized. The springs 61 also form point contacts with the spring beds 59, 180 to minimize the area for conduction therebetween.

The support plate 137, heater 42, and platen 46 together form a flat body portion of the upper platen assembly 16. Likewise, the support plate 139, heater 44, and platen 48 form a flat body portion of the lower platen assembly 18. The springs 61 of the upper press assembly 12 are sufficiently strong to transfer force from inflatable bladders 96, 98 against the flat body portion of the upper platen assembly 16 during a splicing operation. The springs 61 of the lower press assembly 14 are sufficiently strong to support the flat body portion of the lower platen assembly 18 against deflection during the splicing operation.

Additionally, the springs 61 may be made of a resilient material which permits some resilient, localized deflection of the platens 46, 48. This resilient, localized deformation allows the platens 46, 48 to conform to the belt ends 20, 22 and more evenly distribute clamp forces on the belt ends 20, 22 and improves splice quality. The resilient coils 129 of the springs 61 may deform to a deflected configuration, such as by flattening out, and then elastically returning to a generally undeflected configuration, such as a more circular shape, after the loading from the splice operation has ended.

With reference to FIG. 9, the springs 61 include air gaps 142 generally between the curved portions 130 as measured longitudinally along the spring bed as well as air gaps 144 (see FIG. 5) between adjacent springs 61. This way, each point contact 136 between the spring 61 and the support plates 137, 139 is surrounded by a contiguous air gap roughly in the shape of a donut. While the springs 61 support or press against the platen assemblies 16, 18 at the point contacts 136, the air gaps 142, 144 surrounding the point contacts 136 reduce the surface area for conductive heat transfer between the springs and the platen assemblies 16, 18.

The springs 61 may be compression springs having a helical shape. The springs 61 may be made from circular wire or wire having other cross-sectional shapes. In one form, the wire of the springs 61 has a circular cross section with a cross-sectional diameter of 1.5 mm. This relatively small cross section limits the conduction of heat through the material of the springs 61. The springs 61 may be made from a metallic material, such as steel, spring steel, stainless steel. The material of the springs 61 may be selected to provide sufficient strength while providing a relatively low heat conduction to limit conductive heat transfer through the material of the springs 61, such as stainless steel.

Figure 12:
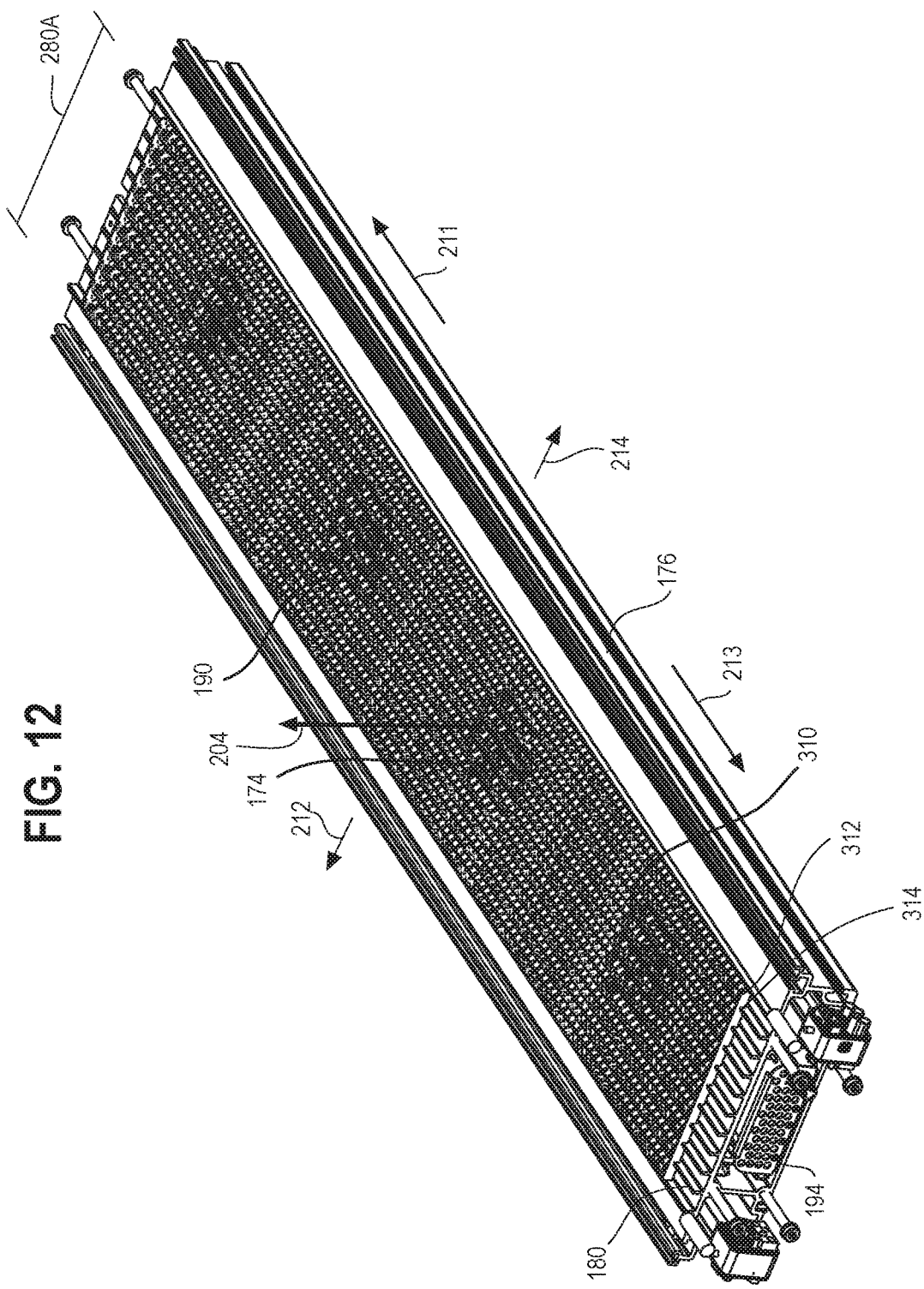
FIG. 12 is a perspective view of the lower press assembly of FIG. 11 showing springs of the insulating assembly of the lower press assembly that support a platen assembly of the lower press assembly.

Returning to FIGS. 1 and 4, the splice press 10 includes clamps 40 that are used to clamp the upper and lower press assemblies 14 together on the conveyor belt ends 20, 22 with a desired clamping force. The upper press assembly 12 has a pressure device 92 that is operated to apply further pressure, such as approximately two bar, to the platens 46, 48 and increase the clamping force applied thereto. With reference to FIGS. 8A and 12, the springs 61 are secured in spring beds 59, 180 above and below the upper and lower platen assemblies 16, 18. Returning to FIGS. 4 and 5, the pressure device 92 includes the pair of inflatable bladders 96, 98 positioned between an extruded upper frame 81 of the upper press assembly 12 and the spring bed 59. Inflating the bladders 96, 98 urges the spring bed 59 and springs 61 secured therein downwardly in direction 99, which urges the support plate 137, heater 42, and platen 46 downwardly as well. In other forms, the pressure device 92 may be included in the lower press assembly 14, both the upper and lower press assemblies 12, 14 could include a pressure device, or neither of the upper and lower press assemblies 12, 14 may have a pressure device.

With reference to FIG. 4, the upper and lower press assemblies 12, 14 each include a cooling system, such as forced air cooling systems 70, 72 for cooling the platens 46, 48 once the belt ends 20, 22 have been subjected to the desired pressure, temperature, and duration for the particular belt ends 20, 22. The forced air cooling systems 70, 72 rapidly cool the platens 46, 48 which may improve splice quality by reducing the duration of a splicing operation. By more quickly cooling the platens 46, 48, the forced air cooling systems 70, 72 also decrease the time it takes to perform splicing operations on multiple conveyor belts 20.

The forced air cooling system 70 directs airflow through a gap 90 between the bladders 96, 98 to cool the platen 46 as shown in FIG. 4. The upper forced air cooling system 70 and bladders 96, 98 thereby permit cooling of the platen 46 while at the same time providing the ability to apply a clamping force to the platen 46 by inflating the bladders 96, 98. This is an advantage over some prior systems where air cooling was only available for the platen not shifted by an inflatable bladder.

Figure 5:
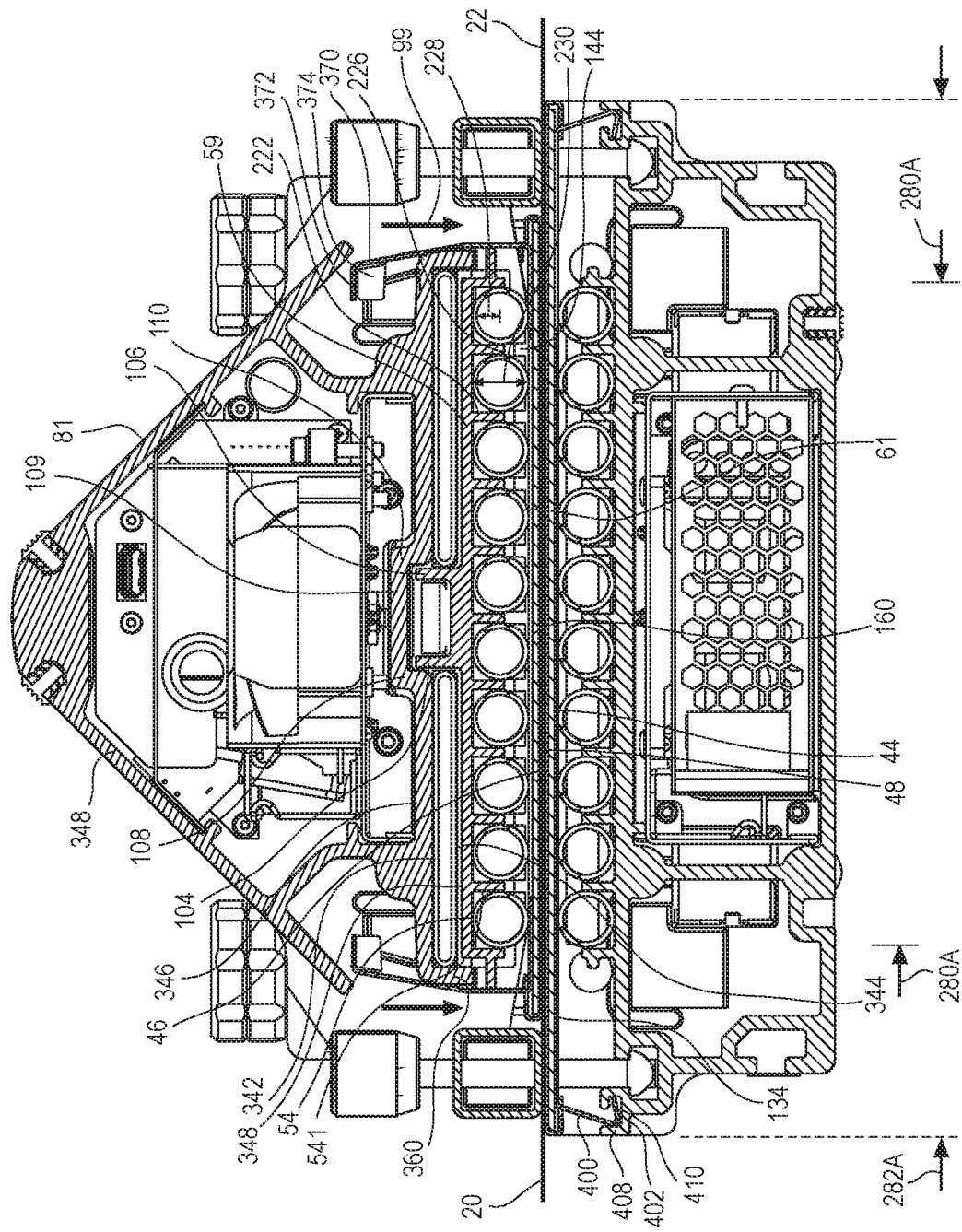
FIG. 5 is a cross-sectional view similar to FIG. 4 showing a pair of inflatable bladders in an expanded configuration and the platen assemblies clamping conveyor belt ends therebetween.

With reference to FIGS. 4 and 7A, the upper forced air cooling system 70 includes a longitudinally extending air flow assembly 76 that supports fan assemblies 78 positioned above an elongate duct 100 in the gap 90. The duct 100 is formed in part by portions of the frame 81 and the spring bed 59, such as a larger channel 100A of the frame 81 and a smaller channel 100B of the spring bed 59, and extends substantially the entire working length of the upper platen 46. The channels 100A, 100B include a pair of upstanding walls 104, 106 of the spring bed 59 nested within a pair of downwardly depending walls 108, 110 of the frame 81, as shown in FIGS. 4 and 5.

Figure 8B:
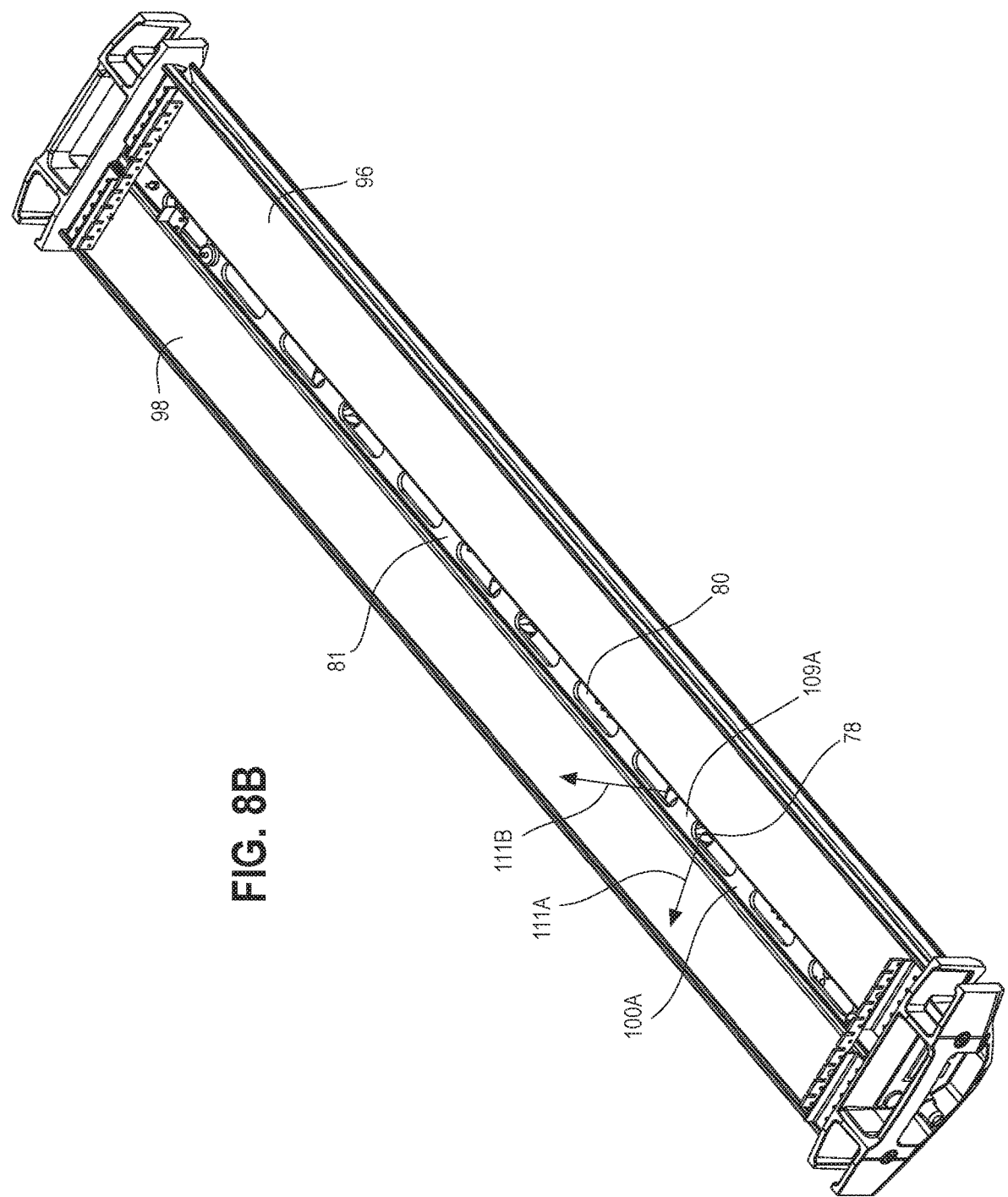
FIG. 8B is a bottom perspective view similar to FIG. 8A showing the springs and a spring bed of the upper press assembly removed to show openings of the frame that permit fans in the frame to direct airflow through a gap between the bladders.

With reference to FIG. 8B, the channel 100A of the frame 81 includes a laterally extending wall 109 with openings 80 positioned between the bladders 96, 98 that open into the duct 100. The wall 109 includes lands 109A separating the openings 80. The fan assemblies 78 are positioned above the lands 109A with portions of the fan assemblies 78 extending longitudinally over the adjacent openings 80. In this way, a majority of the airflow from the fan assemblies 78 first impacts the lands 109A and imparts a longitudinal component of movement to the airflow so that it exits the openings 80 generally in directions 111A, 111B. This longitudinal component of airflow encourages longitudinal movement of air along the duct 100.

With reference to FIG. 7A, the fan assemblies 78 include fans 82 rotatable about axes 83 oriented to draw cooler, ambient air into the air flow assembly 76 through screens 86 (see FIG. 2). The fan assemblies 78 include electric motors to rotate the fans 82 and substantially cylindrical fan shrouds 82A extending around the fans 82. Each fan shroud 82A includes an inlet opening at one end of the shroud 82A and an outlet opening at the other end of the shroud 82A. The fan shrouds assist in directing airflow through the fan assemblies 78 and improving the efficiency of the fans 82.

During a cooling operation, the fan assemblies 78 direct airflow in directions 111A, 111B (see FIG. 8B) through the openings 80 of the frame channel 100A, longitudinally along the duct 100, vertically outward in direction 116 through openings 114 (see FIGS. 8A and 10) of the spring bed 59, into the volume generally occupied by the springs 61, and against the support plate 137 (see FIG. 4). With reference to FIG. 8, once the air reaches the support plate 137, the fan assemblies 78 push the air laterally in directions 154, 156 between the coils 129 of adjacent springs 61. Further, the springs 61 have central, longitudinal openings 132 with the curved portions 130 extending thereabout. The central openings 132 permit some air to flow longitudinally through the centers of the springs 61. In this manner, the fan assemblies 78 direct air through openings 80 of the frame 81 and through openings 114 of the spring bed 59 which are both vertically aligned with a central, high temperature portion 160 of the upper platen 46 (see FIG. 5) so that the air first removes heat from the high temperature portion 160. The fan assemblies 78 then direct the air flow or laterally in directions 154, 156 which reduces the temperature of the support plate 137, heater 42, platen 46, and springs 61 as the air flow travels toward the periphery of the spring bed 59.

Although the airflow through the insulating assemblies 56, 58 has been discussed using the terms lateral and longitudinal for ease of discussion, it will be appreciated that the airflow through the insulating assemblies 56, 58 may include components of both longitudinal and lateral movement as well as swirling or other movements. It is believed that the arrangement of the many walls and coils 129 of the springs 61 contributes to turbulent airflow within the insulating assemblies 56, 58 which further increases the rate at which the forced air cooling systems 70, 72 can remove heat from the platen assemblies 16, 18.

Figure 11:
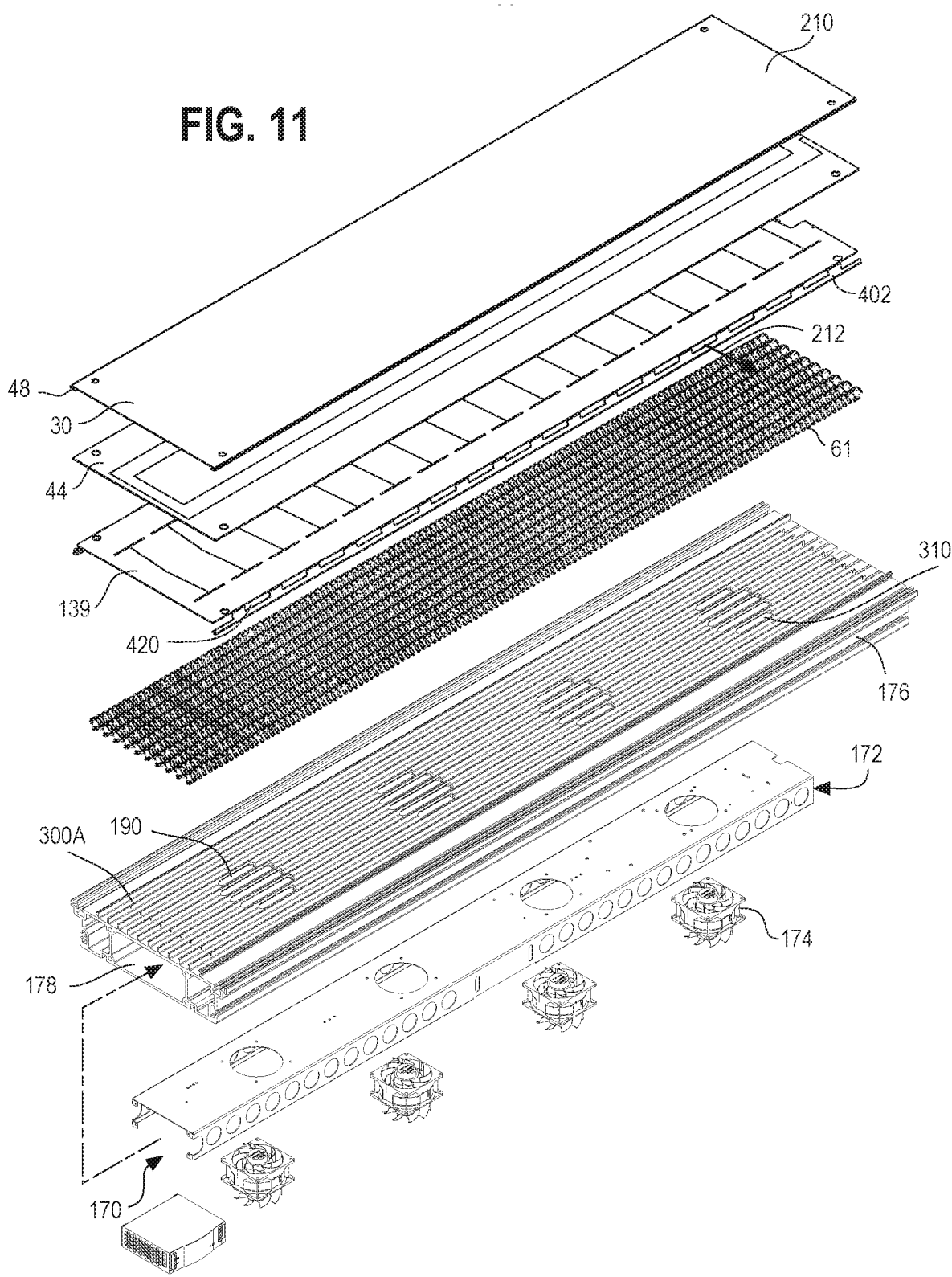
FIG. 11 is an exploded view of a portion of the lower press assembly of FIG. 1 showing a cooling system that is received within a lower frame of the lower press assembly.

With reference to FIGS. 4 and 11, the forced air cooling system 72 of the lower press assembly 14 is similar to the forced air cooling system 70 of the upper press assembly 12 and is configured to direct air into the insulating assembly 58 and rapidly cool the lower platen 48 after a splicing operation. One difference between the forced air cooling systems 70, 72 is that the forced air cooling system 72 of the lower press assembly 14 does not include a duct like duct 100 to direct airflow longitudinally before directing the airflow vertically into the insulating assembly 58. Instead, the air cooling system 72 has fan assemblies 174 that direct airflow vertically upward into the insulating assembly 58 rather than having an intervening duct as in the forced air cooling system 70. However, in some applications, the forced air cooling system 72 may include a duct similar to duct 100 if desired.

The forced air cooling system 72 includes an airflow assembly 170 having a shroud 172 that contains fan assemblies 174. The lower press assembly 14 has an extruded, lightweight frame 176 (see FIG. 13) with an internal cavity 178 that receives the shroud 172 and fan assemblies 174 therein. In one approach, the shroud 172 and fan assemblies 174 may be slid longitudinally into the cavity 178 during assembly of the lower press assembly 14. Further, the shroud 172 may be slid longitudinally outward from the cavity 178 during disassembly of the lower press assembly 14 which makes maintenance easier.

With reference to FIG. 11, the lower frame 176 includes a support portion, such as a spring bed portion 180 that receives springs 61 which support the lower platen assembly 18. With reference to FIG. 11, the lower frame 176 has openings 190 and the fan assemblies 174 are generally aligned with the openings 190. The shroud 172 includes a vent 194 at each of the ends of the splice press 10 as shown in FIG. 12. With reference to FIG. 2, the vents 194 are not covered by the belt ends 20, 22 when the belt ends 20, 22 are clamped between the upper and lower platen assemblies 16, 18. Rather, the vents 194 are uncovered and permit the fan assemblies 174 to draw cooler, ambient air in direction 200 into the ends of the shroud 172 and toward the fan assemblies 174.

Turning to FIG. 12, the fan assemblies 174 draw air within the shroud 172 up through the openings 190 of the frame 176 and direct the air into the insulating assembly 58. The fan assemblies 174 direct the air vertically upward in direction 204 through the springs 61 and against the support plate 139 of the lower platen assembly 18. The fan assemblies 174 and the openings 190 of the frame 176 are generally aligned with a central, high-temperature portion 210 (see FIG. 11) of the lower platen 48. The fan assemblies 174 thereby cause the air to remove heat first from the central portion 210 before traveling longitudinally 211, 213 and laterally 212, 214 away from the openings 190 toward the periphery of the spring bed 180.

Returning to FIG. 10, the spring bed 59 includes channels 220 that receive the springs 61. The channels 220 include walls 222 extending along the spring bed 59 that separate the springs 61 and resist lateral movement of the springs 61. The channels 220 include a center channel 220A with the openings 114 therein, the channel 220A having lands 224 that separate the openings 114 along the channel 220A. The walls 222 of the channel 220A and the lands 224 support the spring 61 received in the channel 220A while, at the same time, permitting airflow from the fan assemblies 78 to travel toward the upper platen assembly 16.

Figure 10:
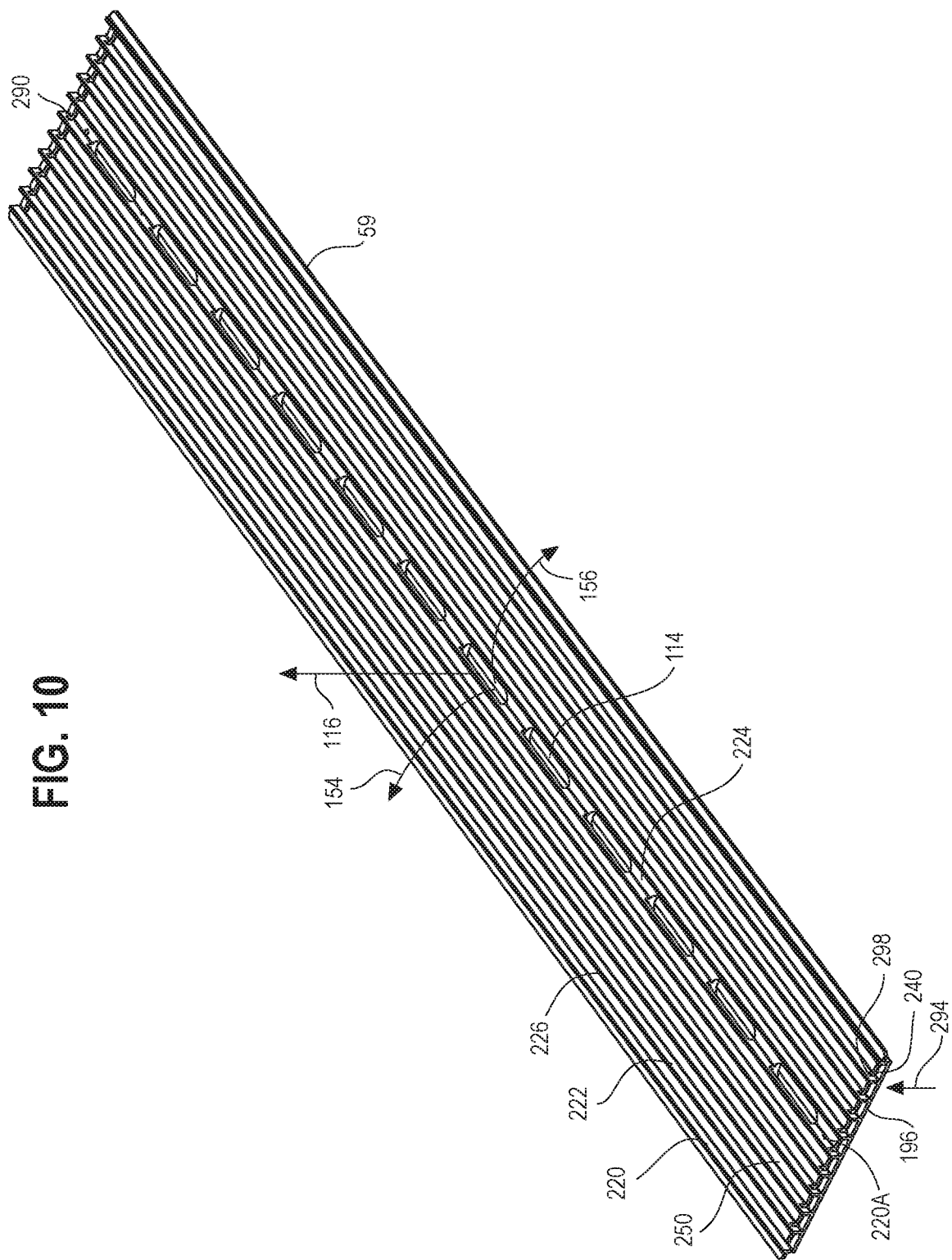
FIG. 10 is a perspective view of the spring bed of the upper press assembly of FIG. 1 showing longitudinal channels that receive the springs.

With reference to FIGS. 5 and 10, the walls 222 have ends 226 and heights 228 that are shorter than the height or diameter 230 of the springs 61. Because the wall height 228 is shorter than the spring diameter 230, the wall ends 226 are spaced from the support plate 139 to resist conductive heat transfer from the support plate 139 to the spring bed 59. The height 228 may be a portion of the diameter 230, such as greater than one half of the diameter 230, so that the walls 222 extend above the equator of the springs 61 to prevent a minimal amount of lateral movement of the springs 61. As an example, the height or diameter 230 of the springs 61 may be approximately 16 mm and the wall heights 228 may be approximately 11 mm. In another form, the wall height 228 may be greater than three quarters the spring diameter 230.

With reference to FIGS. 8A and 10, the spring bed 59 includes a pair of capture members 240 at the longitudinal ends of the spring bed 59 to retain the springs 61 within the channels 220. In one approach, the springs 61 are compression springs and are compressed prior to inserting the springs 61 into each channel 220 between the capture members 240. Because the springs 61 are under compression, the springs 61 are thereby restrained in longitudinal directions 150, 152 against movement by the capture members 240. Further, the walls 222 resist lateral movement of the springs 61 in directions 154, 156. To restrain the springs 61 against vertical movement, the channels 220 include walls 250 that support the upper portions of the springs 61 and the support plate 137 contacts the lower portions of the springs 61, as shown in FIG. 4. In this manner, the springs 61 are restrained between the spring bed 59 and the upper platen assembly 16.

Figure 3:
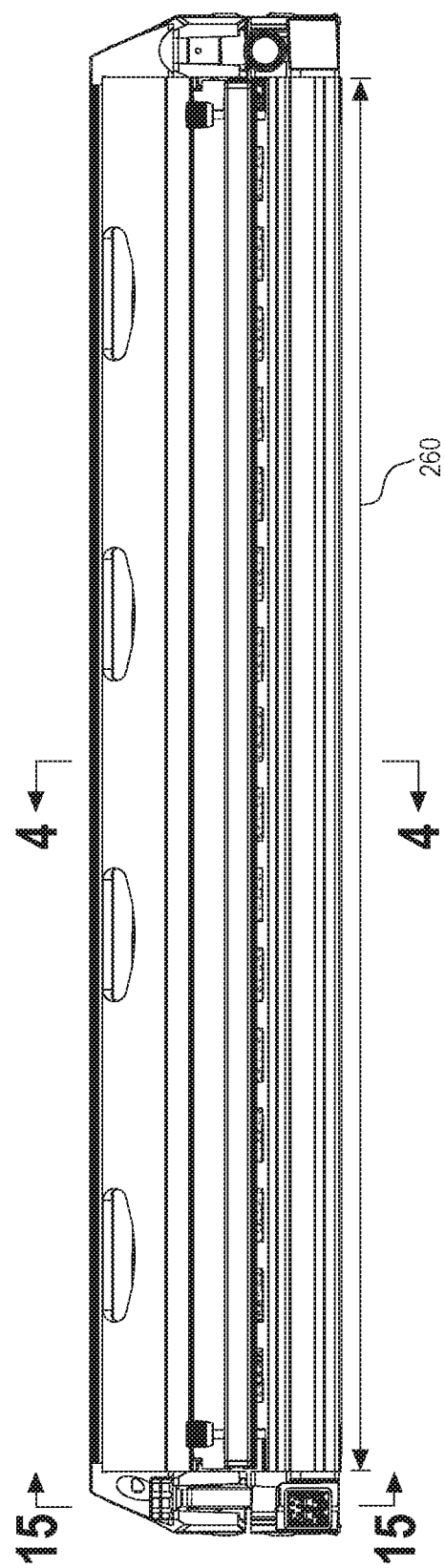
FIG. 3 is a side elevational view of the conveyor belt splicing apparatus of FIG. 1 showing a longitudinal length of the apparatus.

With temporary reference to FIG. 3, the platens 46, 48 have a longitudinal working length 260 for extending across the conveyor belt ends 20, 22. With reference to FIG. 8A, the springs 61 have a length 262 once the springs 61 have been secured in the spring bed 59. In one approach, the spring length 262 is close to the working length 260 to provide support along the entire length of the working surfaces 30, 32 (see FIGS. 6 and 11). Further, the springs 61 in the spring bed 59 have an overall lateral width 280 that is selected to be at least half, at least three quarters, or at least nine-tenths of a lateral width 282 of the platen 46 (see FIGS. 6 and 8A). With reference to FIG. 5, the lower platen 48 may be laterally wider than the upper platen 46 and the springs 61 of the lower press assembly 14 may have an overall lateral width 280A that is at least half, at least two-thirds, or at least three-quarters a lateral width 282A (see FIG. 5) of the platen 48. The springs 61 thereby provide support for the majority of the surface area of the platens 46, 48 while at the same time resisting heat loss from the platens 46, 48. As an example, the splice press 10 may have has the following dimensions:

| Dimension | Measurement (mm) |
|---|---|
| 260 | 1305 |
| 262 | 1224 |
| 280 | 171 |
| 282 | 290 |
| 280A | 171 |

Turning to FIG. 10, the capture members 240 are removably received in notches 290 formed in an upper side 296 and the walls 222 of the spring bed 59. To install one of the capture members 240 into the spring bed 59, the capture member 240 is advanced in direction 294 into the notch 290 until the capture member 240 contacts an end 298 of the notch 290 in the walls 222. The end 298 restricts further movement of the capture member 240 in direction 294 and, once the springs 61 have been compressed and loaded into the channels 220 between the capture members 240, the springs 61 urge the plates 241 against the longitudinal ends of the notches 290 which holds the plates 241 in the notch 290.

Figure 13:
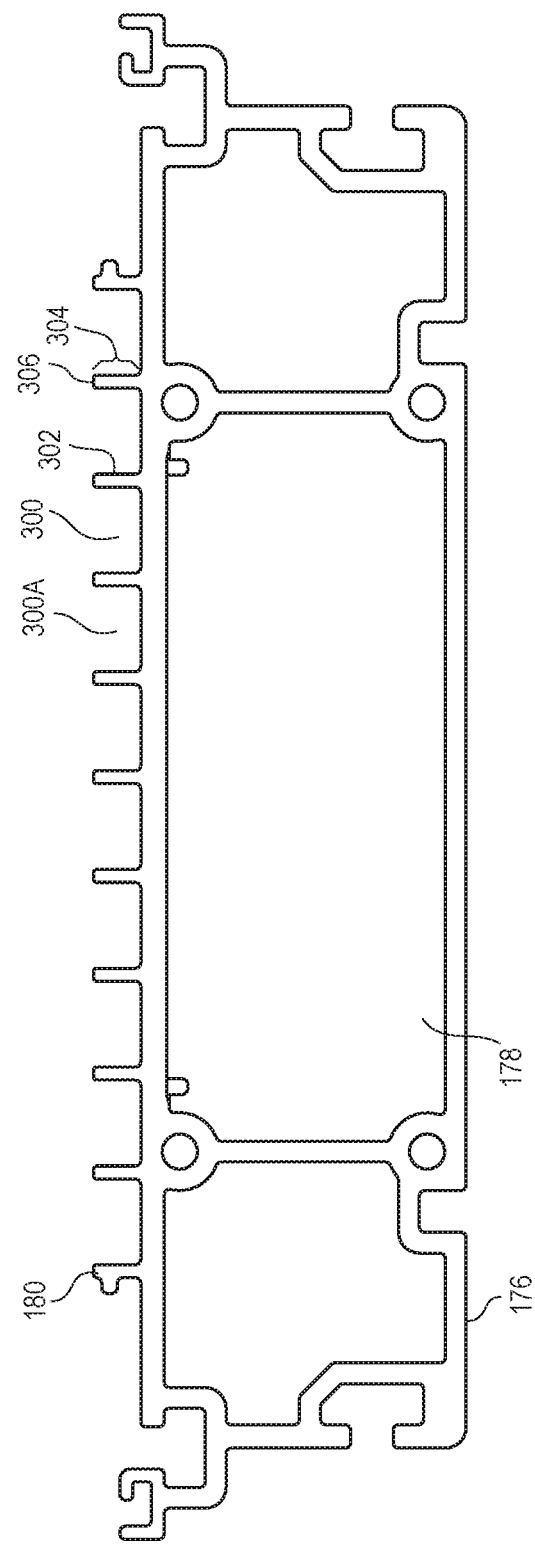
FIG. 13 is an end elevational view of the frame of the lower press assembly of FIG. 12.

With reference to FIGS. 12 and 13, the spring bed 180 of the lower frame 176 is similar in many respects to the spring bed 59 discussed above. For example, the spring bed 180 includes channels 300 with walls 302 having a height 304 that is less than the spring height or diameter 230. This positions ends 306 of the walls 302 away from the support plate 139 of the lower platen assembly 218. In this way, conductive heat transfer between the support plate 139 and the walls 302 is reduced which improves the efficiency of the lower platen assembly 16.

With respect to FIGS. 11 and 13, some of the channels 300A have openings 310 that together form the opening 190 for the fan assemblies 174. The walls 302 of the channels 300A extend uninterrupted over the openings 190 to provide lateral support for the springs 61 as the springs 61 extend across the openings 190. Another similarity between the spring beds 59, 180 is that the spring bed 180 includes a pair of capture members 312 received in notches 314 of the walls 302 as shown in FIG. 12. The springs 61 are held compressed between the capture members 312 within the channels 300.

Figure 6:
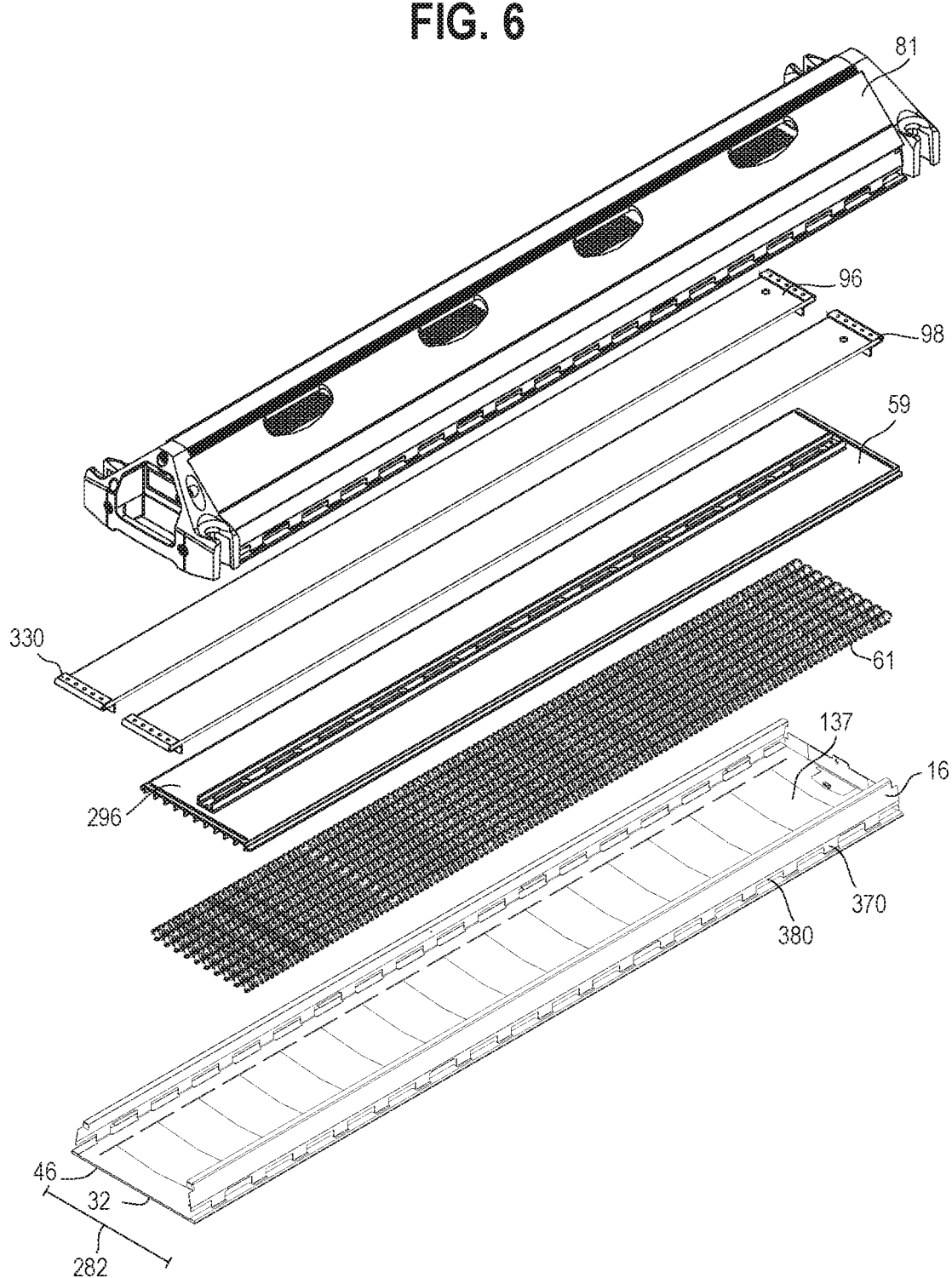
FIG. 6 is an exploded view of portions of the upper press assembly of FIG. 1 showing coil springs of the insulating assembly for supporting a platen assembly of the upper press assembly.

With reference to FIGS. 6 and 8A, the bladders 96, 98 may be made from lengths of flat foldable hose, like a fire hose, and each end of the fire hose is held closed by a clamp 330. The clamps 330 are secured to the upper frame 81 by fasteners and the clamps 330 may include upstanding walls 334 that limit longitudinal movement of the spring bed 59 as the bladders 96, 98 inflate and deflate.

With reference to FIG. 7B, the pressure device 92 includes a compressor 340 operably coupled to the bladders 96, 98, that can inflate or deflate the bladders 96, 98. The compressor 340 is mounted on-board the frame 81 and is connected to the bladders 96, 98 by tubing 101, fittings 103, and valves. As discussed in greater detail below, the splice press 10 includes a main controller 1050 that, in one form, includes a pressure sensor 107 configured to detect the pressure within the bladders 96, 98. To deflate the bladders 96, 98, the pressure device 92 includes a valve 102. In one form, the valve 102 has an actuator, such as a button 102A (see FIG. 14), which a user presses when prompted by a screen 468, lights, and/or a buzzer at the completion of a splice operation. The valves may also include a quick exhaust valve 105 and a relief valve 105A. In another form, the main controller 1050 automatically operates the valve 102 to release the pressure from the bladders 96, 98.

As noted above, the clamps 330 secure the bladders 96, 98 against longitudinal movement relative to the frame 81 and generally secure the bladders 96, 98 to the frame 81. Each of the bladders 96, 98, are also generally constrained to inflate in a predetermined manner by the frame wall 346, a bladder support portion 348 of the spring bed 59, and a lateral downwardly depending wall 360 of the frame 81, and an upstanding wall 104 of the spring bed 59 as shown in FIG. 5. The generally rectangular configuration of the frame wall 346, the bladder support portion 348, the frame wall 360, and the spring bed wall 104 urge the bladders 96, 98, to have a maintain a rectangular shape when inflated which further encourages flattening of upper and lower portions 342, 344 of the bladders 96, 98 and a more even distribution of pressure against the spring bed 59.

With reference to FIGS. 5 and 6, the upper platen assembly 16 includes the platen 46, the heater 42, and the support plate 139, as discussed above. The upper platen assembly 16 also includes legs 370 that extend along the frame wall 360 and hook inwardly at a foot 372. The foot 372 is configured to engage a stud 374 at each end 380, 382 of the splice press 10 (see FIG. 1). The engagement of the feet 372 of the legs 370 with the studs 374 captures the upper platen assembly 16, the springs 61, and the spring bed 59 against the upper frame 81.

With reference to FIGS. 5 and 11, the lower platen assembly 18 includes the platen 48, the heater 44, and the support plate 139 as discussed above and further includes leg portions 400 that extend downwardly and then inwardly at feet 402. The lower frame 176 includes channels 408 on opposite lateral sides thereof that receive the feet 402 of the platen leg portions 402. The feet 402 extend under a lip 410 of the channel which secures the leg portions 402 relative to the lower frame 176. In this manner, the lower platen assembly 18 is secured to the lower frame 176 which in turn secures the springs 61 received in the spring bed 180 vertically between the support plate 139 and the lower frame 176.

With reference to FIGS. 6 and 7A, the legs 370 of the upper platen assembly 16 include openings 380 that permit air flow which has traveled in directions 154, 156 (see FIG. 8A) to exit the upper press assembly 12 after cooling the upper platen 46. The openings 380 may be vertically positioned so that airflow can travel over the walls 222, between the coils 129 of adjacent springs, and outward through the openings 380 without having to contort vertically. Likewise, the leg portions 402 of the lower platen assembly 18 have openings 420 that permit air flow to exit in direction 212 after cooling the lower platen 4 as shown in FIG. 11.

With reference to FIG. 1, the ends 380, 382 may be releasably secured to the frames 81, 176. To service or otherwise disassemble the splice press 10, one or both of the ends 380, 382 may be removed from the upper and lower frames 81, 176. The upper and lower platen assemblies 16, 18 may be slid longitudinally relative to the upper and lower frames 81, 176 to disengage the upper and lower platen assemblies 16, 18 from the upper and lower frames 81, 176.

This permits removal of the springs 61 and, for the upper frame 81, removal of the spring bed 59.

Figure 14:
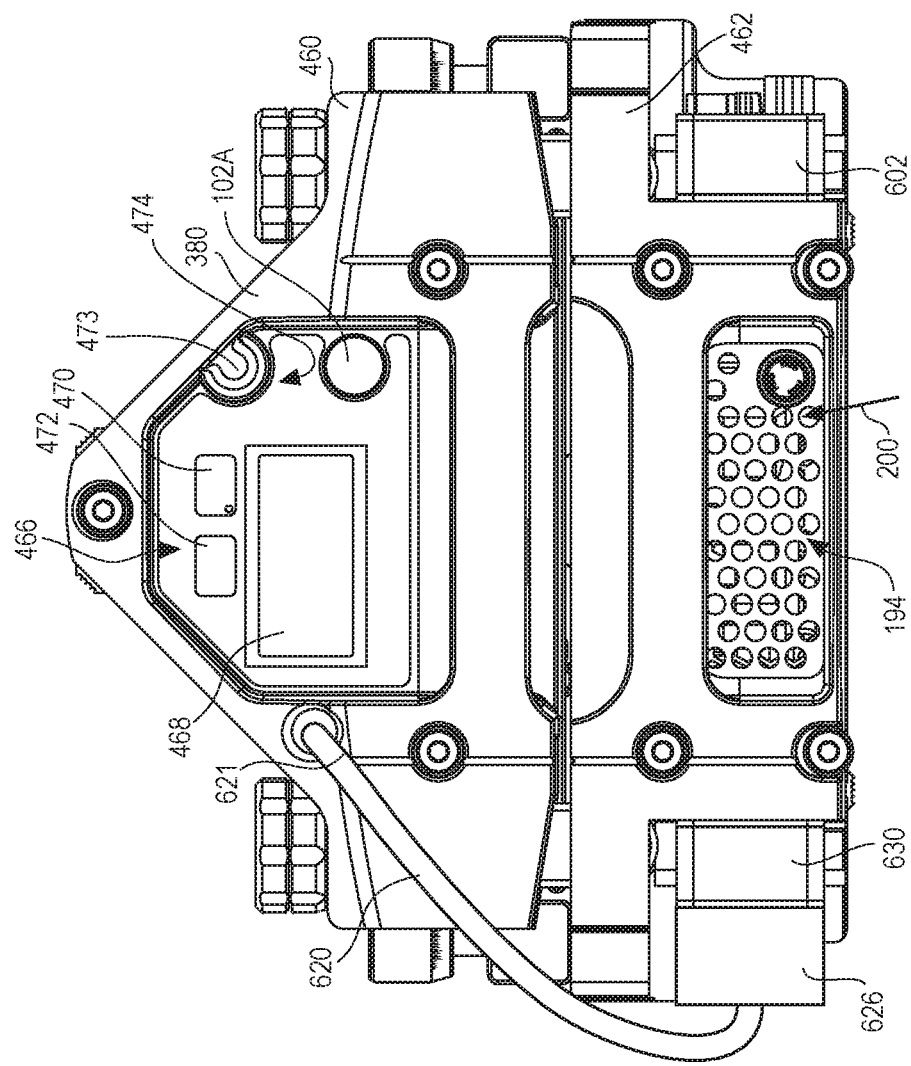
FIG. 14 is an end elevational view of the conveyor belt splicing apparatus of FIG. 1 showing a user interface including a screen and buttons for operating the apparatus.
Figure 21:
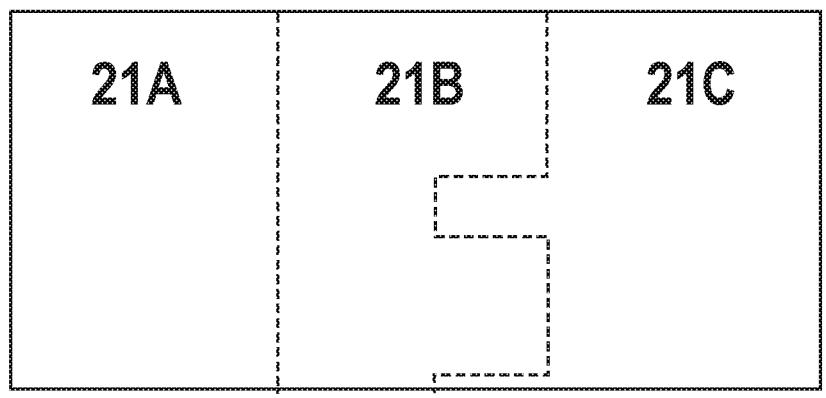
FIGS. 21, 21A, 21B, 21C, and 21D are schematic representations of an electrical circuit of the conveyor belt splicing apparatus of FIG. 1.
Figure 21A:
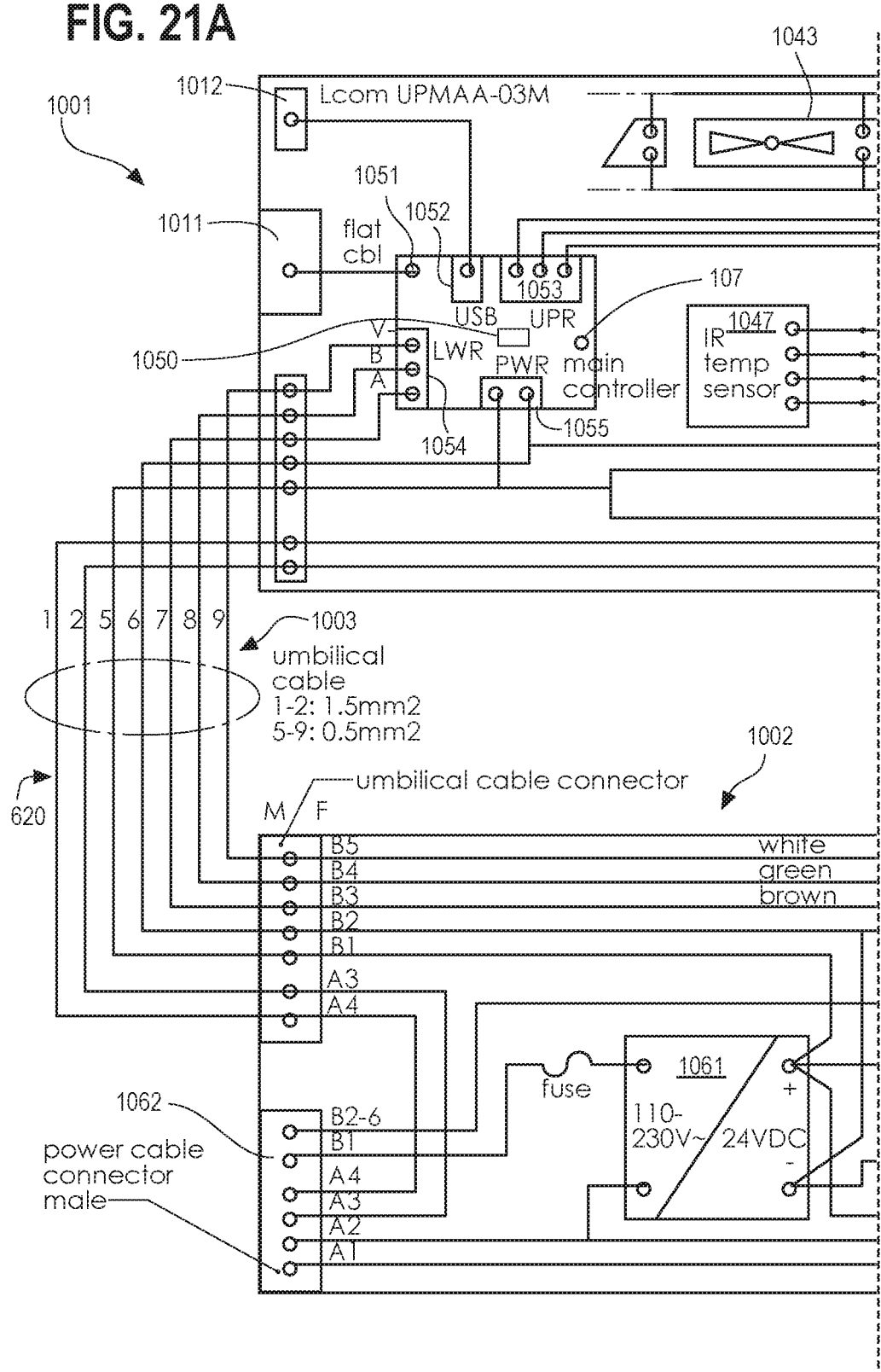

With reference to FIG. 14, the end 380 includes an upper end body 460 and a lower end body 462 that are connected respectively to the upper and lower frames 81, 176. The end 380 includes a user interface 466 that can be used to program, operate, or otherwise control the splice press 10. The user interface 466 may provide prompts for a user to select desired temperatures and durations for the splice operation, and/or may allow the user to select the parameters from a pre-determined collection of options. The user interface 466 may include a variety of audio, visual, and tactile interfaces to receive information from or transmit information to the user. In one approach, the user interface 466 includes a screen 468 for displaying information, start and stop buttons 470, 472, and a navigation knob 473 of a rotary encoder 474 for navigating through menus displayed on the screen 468. The user interface 466 may also include other types of interfaces, such as sensors, receivers or other devices. In one form, the splice press 10 includes a USB port 1012 (see FIG. 21A) that can receive information from a USB drive, such as recipe information that may include temperatures, duration, pressure, and other parameters of the splice process. With reference to FIG. 21A, the power supply circuit 50 may include a main controller 1050 with a memory that stores splice recipes that a user may select from.

Figure 15:
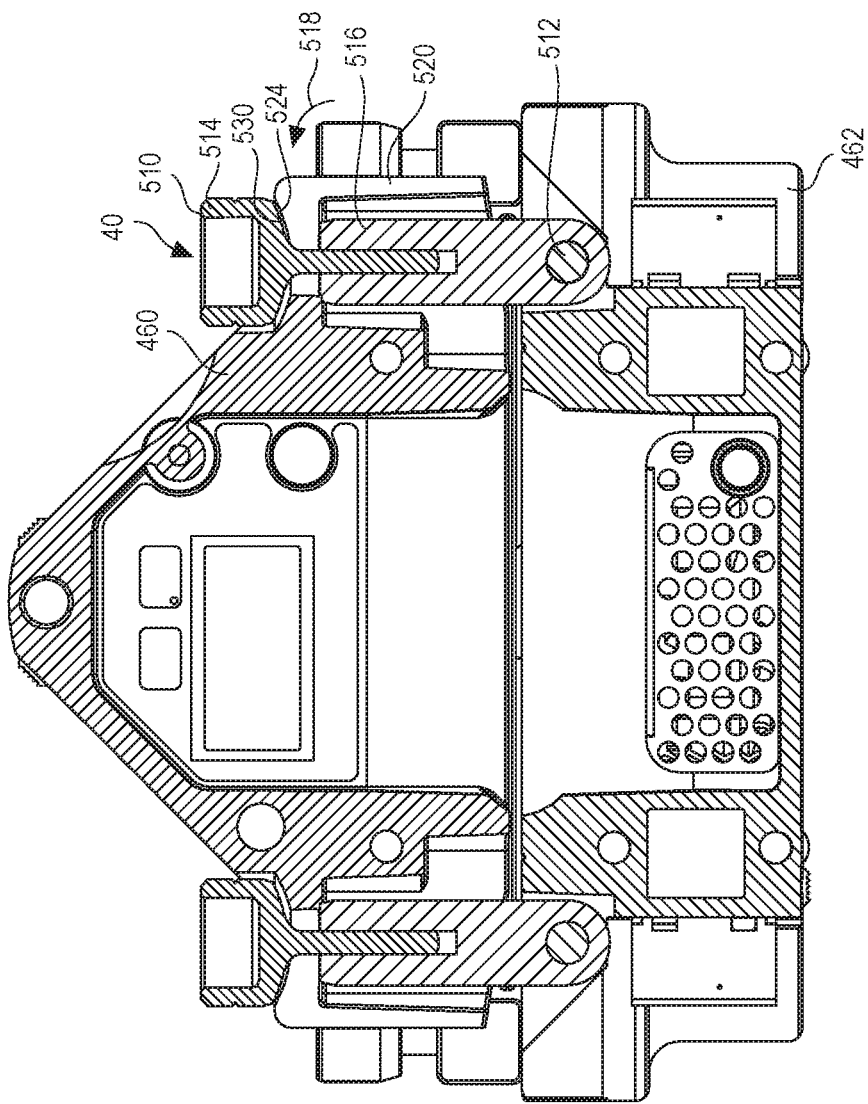
FIG. 15 is a cross-sectional view taken across line 15-15 in FIG. 3 showing clamps holding the upper press assembly relative to the lower press assembly.

With reference to FIG. 15, the clamps 40 include an actuator 510 that is connected to the lower end body 462 at a pivot connection 512. The actuator 510 includes a rotatable handle 514 and a link 516. Once the conveyor belt ends 20, 22 have been positioned onto the lower platen 48, and the upper press assembly 12 has been positioned onto the conveyor belt ends 20, 22, the actuators 510 may be pivoted in direction 518 into slots 520 of the respective upper end body 460 (see FIG. 2). This positions the handles 514 above cup portions 524 of the upper end body 460, as shown in FIG. 15. The user may then turn the handles 514 clockwise, which, by way of a threaded engagement with the links 516, draws the handle 514 downward against the cup portion 524. The user may continue to turn the handle 514 thereby engaging a lower end 530 of the handle 514 against the cup portion 524 of the upper end body 460. This tightening of the handles 514 at each actuator 510 rigidly clamps the upper and lower press assemblies 12, 14 together with the conveyor belt ends 20, 22 therebetween.

With reference to FIGS. 14 and 16-18, the splice press 10 includes an electrical connector, such as a power cord 600, configured to supply electrical power from a standard power supply, such as an electrical outlet, to the power supply circuit 50. The end 380 of the splice press 10 includes a power cord interface, such as a connector 606, which engages an interface, such as a connector 602, of the power cord 600. At the other end of the power cord 600 there is a mains power supply interface, such as a plug 610, for being coupled to the mains power supply. For example, the plug 610 has prongs 612 that engage openings of an electrical outlet.

The splice press 10 may include a plurality of power cords 600 that correspond to different power sources. The plug 610 of each power cord 600 has a particular configuration that can be connected to a specific standard power supply. For example, the plug 610 of a first cord 600 may have prongs 612 arranged to be connected to a socket that provides singe-phase 110 volt, 20 amp power; a second cord 600 may have prongs 612 arranged to be connected to a socket that provides single phase 230 volt, 10 amp power. In another form, a single cord 600 can be used to connect the splice press 10 to different standard power supplies. For example, the plug 610 of the single cord 600 may be reconfigured to adjust the plug 610 to mate with different electrical outlets and send different amounts of power to the splice press 10.

The end 380 of the splice press 10 also includes an electrical connector, such as an umbilical cord 620, which electrically connects portions of the power supply circuit 50 received in the upper and lower frames 81, 176. The umbilical cord 620 has one end 621 that is permanently coupled to the electrical components within the upper frame 81. The other end of the umbilical cord 620 includes an umbilical cord interface, such as connector 626, which couples to a press interface, such as a connector 630, mounted to the lower end body 462. The connection between the umbilical cord connector 626 and the connector 630 permits power and control information to transfer between the portions of the power supply circuit 50 received in the upper and lower frames 81, 176.

Figure 21B:
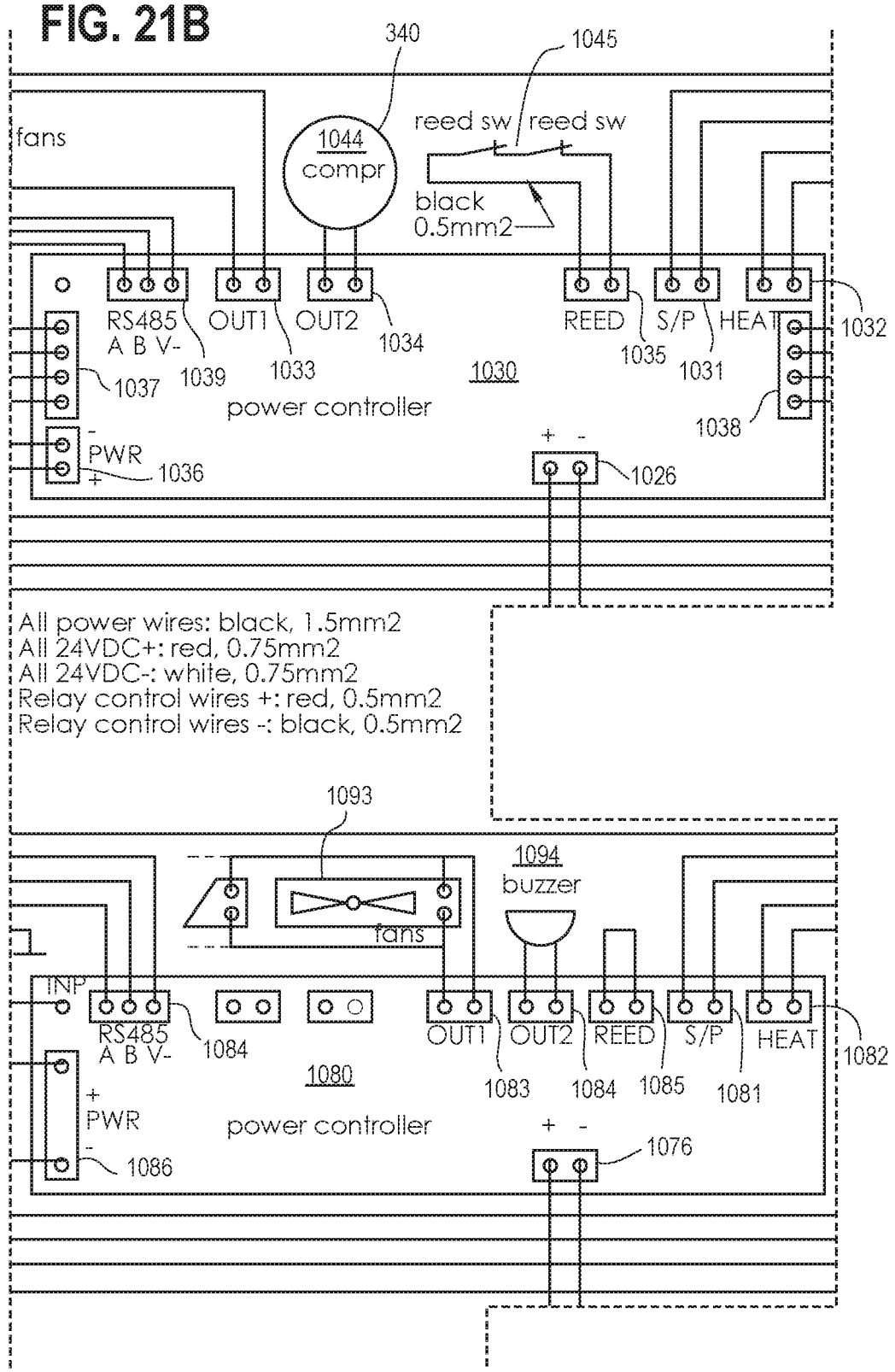
Figure 21C:
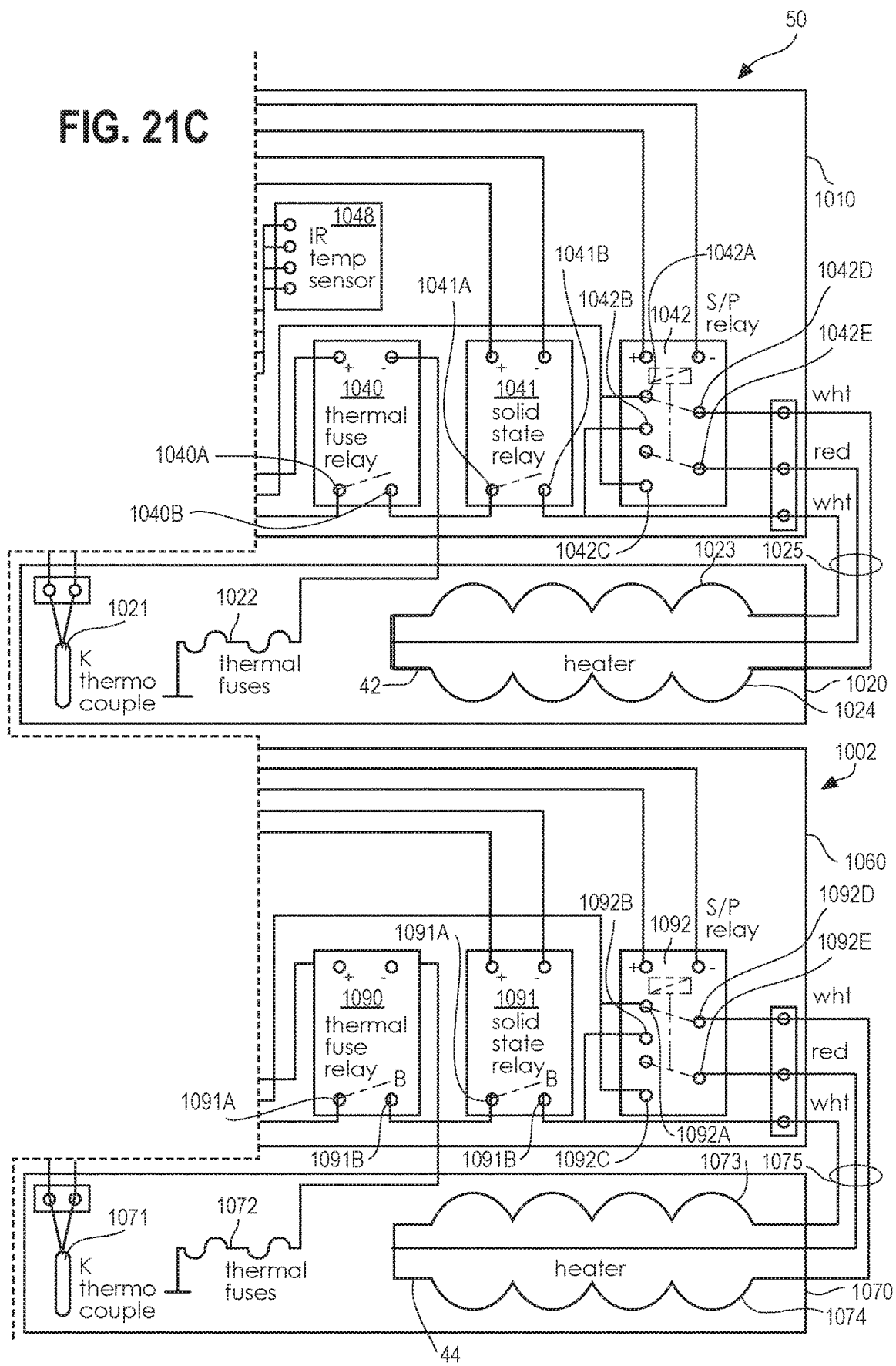

In FIGS. 21A, 21B, and 21C, the splice press 10 includes the power supply circuit 50 having an upper portion 1001 and a lower portion 1002 connected by electrical connectors or wires 1003 of the umbilical cord 620. The upper portion 1001 includes a control portion 1010 and a heater portion 1020, the control portion 1010 monitoring and controlling the heater section 1020. The heater portion 1020 includes the heater 42 of the upper platen assembly 16. The heater 42 includes heating elements 1023, 1024 that receive electrical power from the control section 1010 via wires 1025. The heating elements 1023, 1024 are electrically connected in parallel or in series depending on the power provided by the standard power supply, as discussed in greater detail below.

Similarly, the lower portion 1002 of the power supply circuit 50 includes a control portion 1060 that controls and monitors a heater portion 1070. The heater portion 1070 includes the heater 44 of the lower platen assembly 18. The heater 44 includes heating elements 1073, 1074 that receive electrical power from the control section 1060 via wires 1075. The heating elements 1073, 1074 are electrically connected in parallel or series depending on the power provided by the standard power supply, as discussed in greater detail below.

The control portions 1010, 1060 provide power to the heating elements 1023, 1024 and 1073, 1074 to heat the platens 46, 48. To measure the temperature of the platens 46, 48, the heater portions 1020, 1070 include thermocouples 1021, 1071. The thermocouples 1021, 1071 provide a mV signal to the control portions 1010, 1060. The control portions 1010, 1060 use changes in the signal to determine the temperature being measured by the thermocouples 1021, 1071.

With continued reference to FIGS. 21A, 21B, 21C, the control sections 1010, 1060 each include a power controller 1030, 1080. The power controllers 1030, 1080 control the application of heat to the platens 46, 48 via the heaters 42, 44 and the removal of heat from the platens 46, 48 via the fan assemblies 78, 174. The power controllers 1030, 1080 also have temperature inputs 1026, 1076 which receive temperature reading from the thermocouples 1021, 1071.

The upper portion 1001 of the power supply circuit 50 includes the main controller 1050, which controls the power controllers 1030, 1080. To store recipes for different belt materials and configurations, the main controller 1050 has a memory that may be preprogrammed with recipes that the user can access by using the knob 473 to navigate through menus presented on the display 468. A user may connect a USB drive having recipes stored in a memory thereof to USB port 1012. The main controller 1050 is configured to retrieve the recipe information form the USB drive and transfer the recipe information to the memory of the main controller 1050. In yet another approach, the splice press 10 may include a network interface, such as a modem or wireless device, that can be connected to a remote resource over a network such as the Internet and facilitate obtaining recipes from the remote resource.

The control sections 1010, 1060 also each include a thermal fuse relay 1040, 1090, a solid state relay 1041, 1091, a series-parallel relay 1042, 1092, and fan circuits 1043, 1093. Once the belt ends 22, 24 have been held at the desired temperature, pressure, and time the power controllers 1030, 1080 may energize the fan circuits 1043, 1093 to operate the fan assemblies 78, 174 and cool the platens 46, 48.

Figure 16:
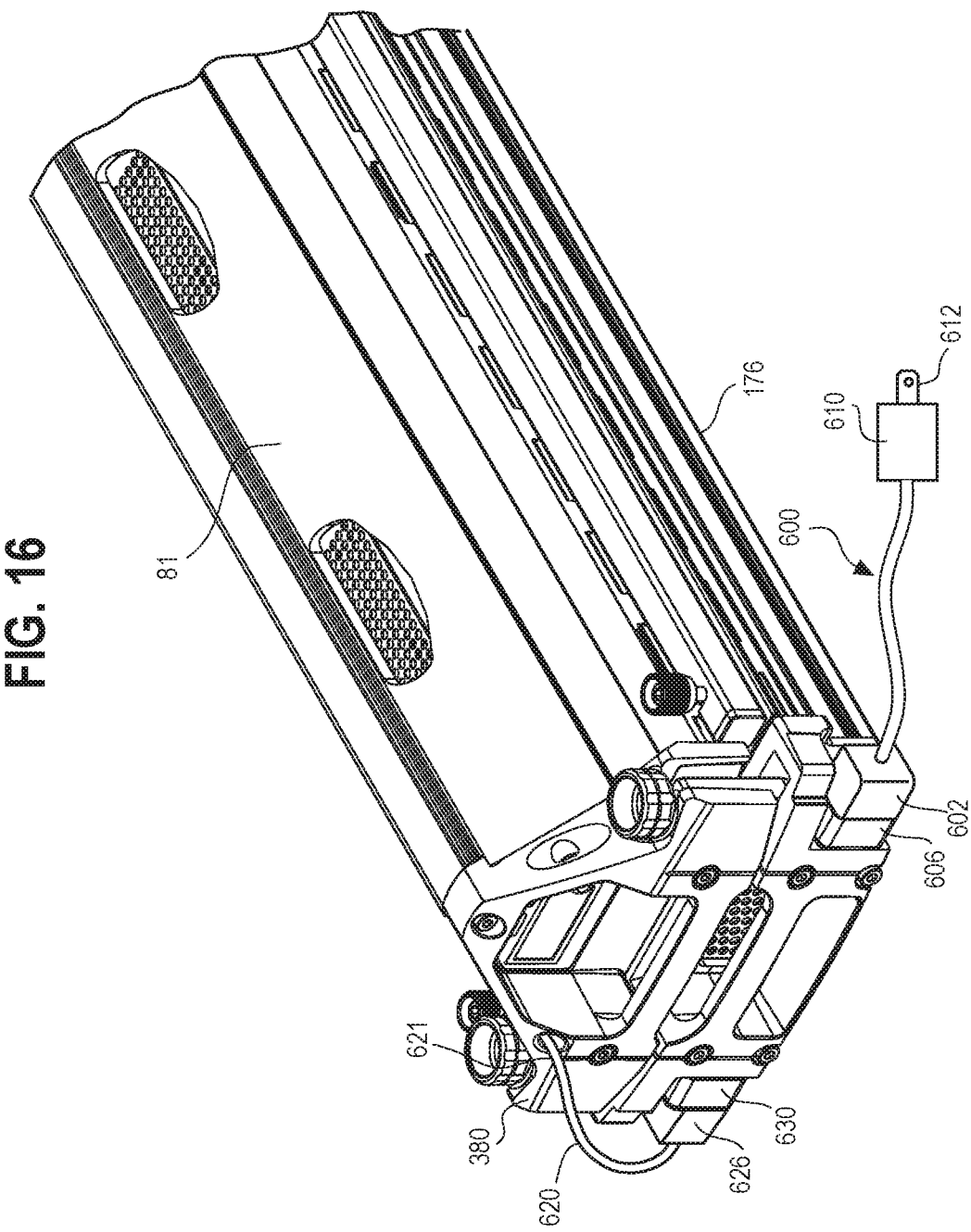
FIG. 16 is a perspective view of an end of the conveyor belt splicing apparatus of FIG. 1 showing an umbilical cord electrically connecting the upper press assembly to the lower press assembly and a power supply cord for connecting the lower press assembly to a standard power supply.

The splice press 10 is powered by standard power sources by way of one or more power cords 600 as discussed above. With reference to FIGS. 16 and 21A, the connector 606 of the lower press assembly 14 has electrical contacts 1062 for being coupled to one of the electrical contacts 1004, 1005, 1006, 1007, 1008, 1009 (see FIG. 21D) of one of the power cords 600. Pins A1, A2, A3, A4, and B1 of the electrical contacts 1063 transmit the electrical power from the power cord 600. The standard power source may be any of a variety of standard wall outlets including single phase, 110 volt 15 amp; single phase, 110 volt 20 amp; single phase, 230 volt, 16 amp; single phase, 230 volt, 30 amp; three-phase, 230 volt, 16 amp; three-phase, 400 volt, 16 amp, and three-phase 460 volt. Other power sources can also be used.

The pins A1, A2, A3, A4, and B1 of electrical contacts 1062 provide power to thermal fuse relays 1040, 1090 and a power supply 1061 of the lower portion 1002 of the power supply circuit 50. The power supply 1061 receives high voltage power from the standard power source, which may be at 110, 230, or 400 volts alternating current (AC), and converts the high voltage power to low voltage power, such as 24 volt direct current (DC) or 12 volt DC.

Figure 17:
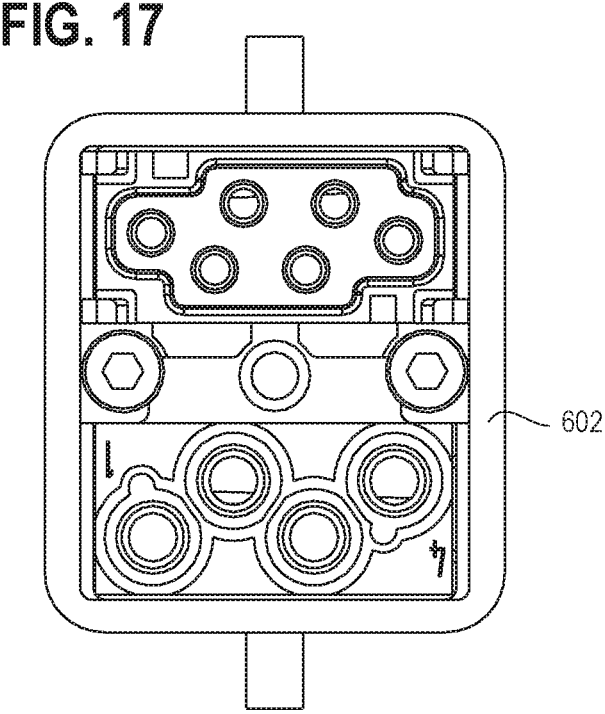
FIG. 17 is an elevational view of a connector of the power cable of FIG. 16 for being connected to the lower press assembly.
Figure 18:
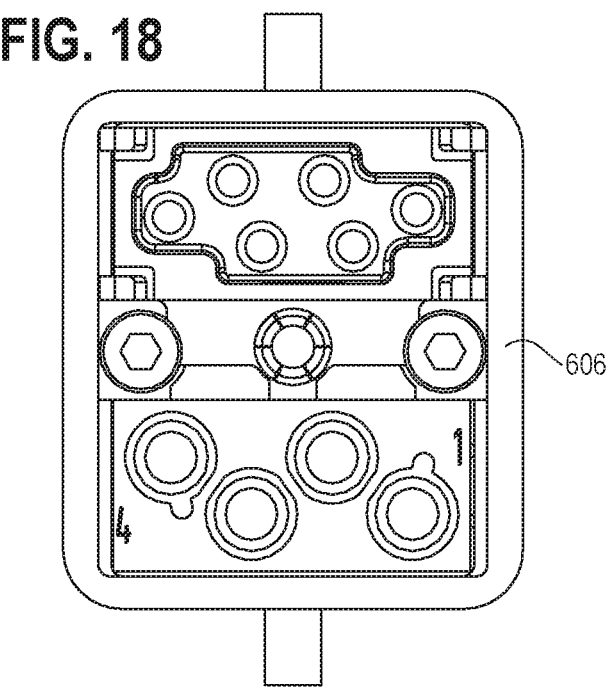
FIG. 18 is an elevational view of a connector of the lower press assembly for being coupled to the connector of FIG. 17.
Figure 19:
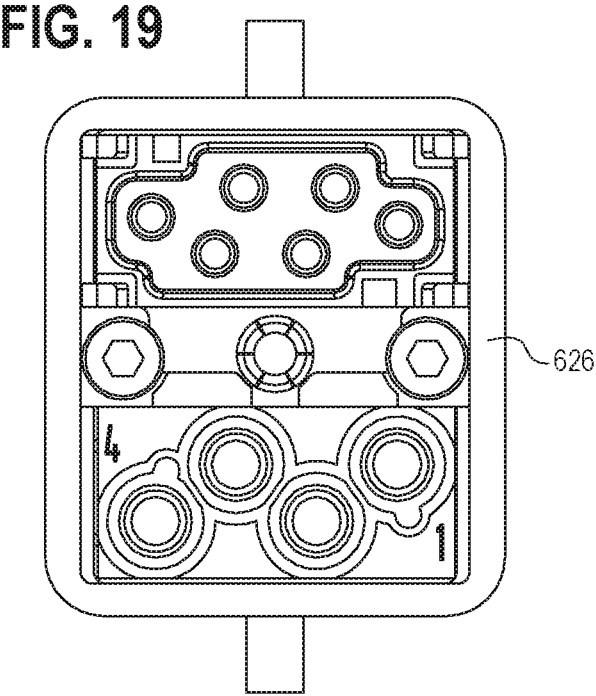
FIG. 19 is an elevational view of an electrical connector of the umbilical cord of FIG. 16.
Figure 20:
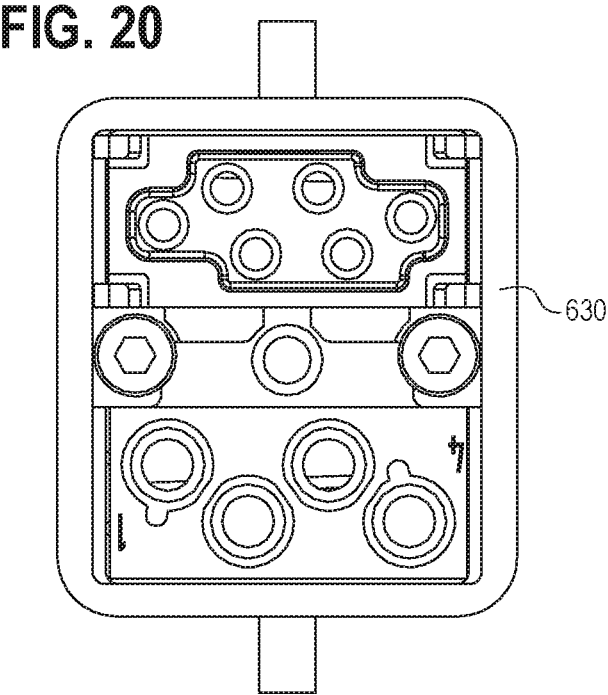
FIG. 20 is an elevational view of an electrical connector of the lower press assembly for being coupled to the umbilical cord connector of FIG. 19.
Figure 21D:
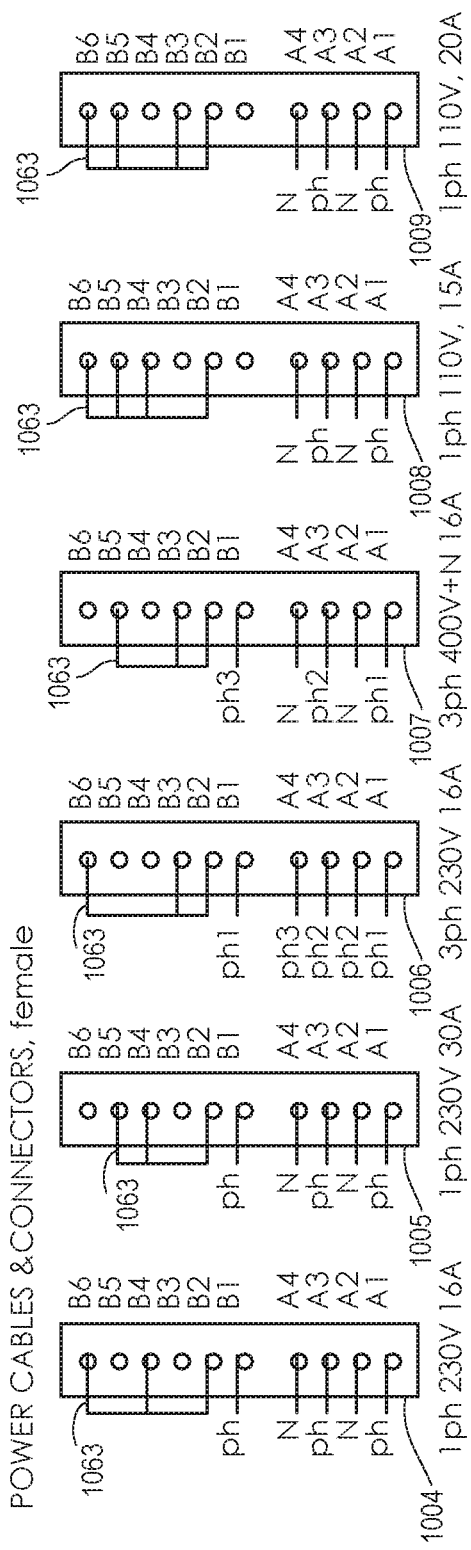

With reference to FIGS. 16 and 21D, the electrical contacts 1062 of the connector 606 are designed to interact with the electrical contacts 1004, 1005, 1006, 1007, 1008, 1009 of the connectors 602 of different power cables 600. With reference to FIGS. 17 and 21D, the connector 602 of each cable includes ten contacts, A1-A4 and B1-B6. Electrical contacts A1-A4 and B1 transmit power to the power supply circuit 50. Electrical contacts B2-B6 of the connectors 602, however, form a binary code designating the standard power source to which the cord 600 is configured to be connected. The binary code is formed by a certain combination of electrical connectors B3-B6 being connected when the connector 602 of the cord 600 is connected to the connector 606 of the lower press assembly 14. More specifically, the connector 602 of each cord 600 has jumpers 1063 connecting two or more of the electrical connectors B3-B6 of the connector 602 to the connector B2 of the connector 602. To configure the power controllers 1030, 1080 according to which cord 600 is connected to the power supply circuit 50, the memory of the main controller 1050 includes a lookup table 609 of FIG. 22 and permits the main controller 1050 to determine the cord 600 connected to the power supply circuit 50 based on the binary code produced by the electrical connectors B3-B6 of the electrical contacts 1004, 1005, 1006, 1007, 1008, or 1009. With reference to FIG. 22, some binary numbers (e.g., 15, 13, 14, 12, 4, and 8) can be associated with different standard power supplies for unique applications of the splice press 10 or additional standard power supplies.

To determine the binary signal produced by the electrical connectors B3-B6, the electrical connector B2 is connected to ground and the connectors B3-B6 receive voltage from the power supply circuit 50. The jumper 1063 of the connector 606 connects one or more of the electrical connectors B3-B6 to the grounded electrical connector B2. Because the jumper 1063 is connected to the one or more electrical connectors B3-B6, the voltage provided to the one or more electrical connectors B3-B6 is pulled to the ground. The resulting low voltage of the one or more electrical connectors B3-B6 is considered a logic "1" while the higher voltage of the electrical connectors B3-B6 not connected to the jumper 1063 is considered a logic "0". As an example with reference to the arrangement of electrical contacts 1004 in FIG. 21D, the power controller 1080 determines the power assigned to the cable 600 by detecting: a "0" for the B3 electrical connector (the first column); a "1" for B4 electrical connector (the second column); a "0" for the B5 electrical connector (the third column); and a "1" for B6 (the fourth column). The power controller 1080 can thereby determine that the electrical contacts 1004 connected to the electrical contacts 1062*a* re associated with a cord 600 for single phase, 230 volt, 16 amp standard power supplies. In another approach, voltage may be provided to pin B6 and a binary signal could be produced by using the jumper 1063 to transfer the voltage to selected ones of the electrical connectors B3-B6.

With reference to FIGS. 16 and 21A, the connector 626 of the umbilical cable 620 is releasably connectable to the connector 630 of the lower press assembly 12. The umbilical cable 620 includes wires 1003. The wires 1003 connected to electrical connections B3-B5 transmit data between the main controller 1050 and the lower power controller 1080. The wires 1003 connected to electrical contacts B1-B2 transmit low voltage DC power from the power supply 1061 to the upper portion 1001 of the power supply circuit 50. Further, the wires 1003 connected to electrical contacts A3-A4 transmit high voltage AC power from the electrical connections 1062 to the upper portion 1001.

With reference to FIG. 21B, the power controllers 1030, 1080 have power inputs 1036, 1086. The power inputs 1036, 1086 receive low voltage DC power from the power supply 1061. The power controller 1030 in the top control portion 1010 receives the power through the wires 1003 of the umbilical cable 620.

The power controller 1030 includes four power outputs 1031, 1032, 1033, 1034 and an input 1035 for a proximity sensor 1045. The power controller 1080 likewise includes four power outputs 1081, 1082, 1083, 1084 an input 1085 which could be used to receive information from the proximity sensor 1045 (but in the illustrated form power controller 1080 is not coupled to the proximity sensor 1045). Each power output includes a positive or hot lead and a negative or neutral lead. The various power outputs of the power controllers 1030, 1080 provide various functionality to the components of the splice press 10. For example, the power controllers 1030, 1080 can selectively energize outputs 1033, 1083 to selectively energize the fan circuits 1043, 1093 such as at the end of the belt splicing procedure in order to cool down the platens 46, 48. The power controllers 1030, 1080 can also energize the fan circuits 1043, 1093 when the power controllers 1030, 1080 detect a temperature of one or both of the platens 46, 48 above a predetermined temperature using the thermocouples 1021, 1071.

The power controller 1030 operates an electrical circuit 1044 of the compressor 340. To inflate the bladders 96, 98, the main controller 1050 sends a signal to the power controller 1030. The power controller 1030 energizes the power output 1034 and causes the compressor 340 to inflate the bladders 96, 98.

With reference to FIG. 21C, the power supply circuitry 50 includes thermal fuse relays 1040, 1090 that are single pole single throw relays which are normally open. The coil of the thermal fuse relay 1040 is powered by the 24 volt DC. The coil is grounded through the thermal fuses 1022. Contact 1040A of thermal fuse relay 1040 is connected to electrical contact A3 of the umbilical cable 620. Contact 1040B of thermal fuse relay 1040 is connected to contact 1041A of the solid state relay 1041.

In operation, 24 volt DC power flows through the coil of the thermal fuse relay 1040, which closes the thermal fuse relay 1040 so that contacts 1040A and 1040B are connected. If the temperature of the platen 46 exceeds a certain temperature, the thermal fuses 1022 break, thus cutting off the ground connection. As a result, the thermal fuse relay 1040 returns to its normally open state, and no longer provides power to the solid state relay 1041. In this manner, the thermal fuse relay 1040 protects against overheating of the upper platen 46.

The thermal fuse relay 1090 operates in substantially the same manner as the thermal fuse relay 1040. High voltage DC power flows from the electrical contact A1, through the coil which is grounded through the thermal fuses 1072. When the lower platen 48 exceeds a certain temperature, the thermal fuses 1072 break, cutting off the ground connection. As a result, the thermal fuse relay 1090 returns to its normally open state, cutting off power to the solid state relay 1091. The thermal fuse relay 1091 thereby protects against overheating of the lower platen 48.

Thermal fuses 1022, 1072 may, in one form, be a set of two fuses in series. Thermal fuses 1022 could alternatively be a single fuse and would still operate in the same manner.

With reference to FIG. 21C, the solid state relays 1041, 1091 are single pole single throw relays that are normally open. The coils of the solid state relays 1041, 1091 are controlled by the power outputs 1031, 1081 of the power controllers 1030, 1080. When power is provided to the coils of the solid state relays 1041, 1091 by the power outputs 1031, 1081, contacts 1041A, 1041B and 1091A, 1091B are connected thus providing power to heating elements 1023, 1073 and series-parallel relays 1042, 1092.

The series-parallel relays 1042, 1092 are double-pole, double-throw relays. The coils of the series-parallel relays 1042, 1092 are powered by power outputs 1032, 1082 of the power controllers 1030, 1080. The series-parallel relays 1042, 1092 each have five contacts 1042A-E and 1092A-E. Contacts 1042B, 1092B are connected to the high voltage AC power via the solid state relays 1041, 1091. In single phase systems, this is the hot lead, in 3-phase systems it is a first phase. Contacts 1042A, 1092A and 1042C, 1092C are connected to the neutral lead or a second phase of the high voltage AC power. Contact 1042D, 1092D are connected to the heating element 1024, 1074 not connected to the solid state relay 1041, 1091. Contact 1042E, 1092E are connected to the opposite end of both heating elements 1023, 1024, 1073, 1074.

When the coils of the series-parallel relays 1042, 1092 are not powered by the power controllers 1030, 1080, contacts 1042A, 1092A are connected to contacts 1042D, 1092D. Contacts 1042B, 1092B; 1042C, 1092C; and 1042E, 1092E are unconnected. In this state, power flows from the solid state relays 1041, 1091, through the first heating elements 1023, 1073, then through the second heating elements 1024, 1074 and back to the neutral lead of the power source through contacts 1042D, 1092D and 1042A, 1092A of the series-parallel relays 1042, 1092. Thus, in this state the heating elements 1023, 1024 and 1073, 1074 are in series.

When the coils of the series-parallel relays 1042, 1092 are powered, contacts 1042B, 1092B are connected to contacts 1042D, 1092D and contacts 1042C, 1092C are connected to contacts 1042E, 1092E. In this state, power flows from the solid state relays 1041, 1091, through the first heating elements 1023, 1073 and through the second heating elements 1024, 1074 via the series-parallel relays 1042, 1092. The power then flows back to the neutral lead through the connection between contacts 1042E, 1092E and 1042C, 1092C. Thus, in this state the heating elements 1023, 1024 and 1073, 1074 are in parallel.

With reference to FIG. 21B, the power controller 1030 powers the proximity sensor 1045 via power outlet 1035. The proximity sensor 1045 may include a series of reed switches mounted in the upper press assembly 12, which interact with one or more magnets in the lower press assembly 14. The proximity sensor 1045 senses how close the upper press assembly 12 of the splice press 10 is to the lower press assembly 14. The power controller 1030 may operate a relay of the compressor 340 in response to the signal from the proximity sensor 1045. If there is too much distance between the upper and lower press assemblies 12, 14, the compressor 340 may be turned off. Further, the power controller 1030 may not heat the platens 46, 48 unless the two upper and lower press assemblies 12, 14 are clamped together, which is determined by the proximity sensor 1045. In other forms, the proximity sensor can be replaced with capacitive sensors, inductive sensors, photoelectric sensors, and/or pressure sensors.

With reference to FIGS. 21A and 21C, the power controller 1030 has two inputs 1037, 1038 connected to temperature sensors 1047, 1048. The temperature sensors 1047, 1048 detect the temperature of the top platen 46 and transmit a signal corresponding to the temperature back to the power controller 1030. The temperature sensors 1047, 1048 can be thermistors, infrared temperature sensors, thermocouples, resistance thermometers, or another kind of electrical temperature sensor. The temperature sensors 1047, 1048 operate as another safety mechanism whereby the power controller 1030 will turn off the heater elements 1023, 1024 via the solid state relay 1031 when the temperature of the upper platen 46 reaches a limit temperature.

The umbilical cord 620 permits two-way information flow between the upper and lower portions 1001, 1002 of the power supply circuit 50. For example, the information flow may be between the main controller 1050 and the power controllers 1030, 1080. The umbilical cord 620 permits the main controller 1050 of the upper portion 1001 of the power supply circuit 50 to communicate with the power controller 1080 of the lower portion 1002 of the power supply circuit 50.

With reference to FIG. 21B, the power controller 1080 includes a power outlet 1084 connected to a buzzer 1094. The buzzer is 1094 used to emit sound to notify the user of certain states. For example, the buzzer 1094 could sound when the belt splicing process is complete, or it could sound when the temperature of the platens 46, 48 exceeds a certain threshold. In alternative embodiments, the buzzer 1094 can include a light or be replaced by a light.

With reference to FIG. 21A, the main controller 1050 includes a power input 1055 receiving power from the umbilical cable 620. The main controller 1050 also includes two data ports 1053, 1054 for communicating with the power controllers 1030, 1080. The main controller 1050 further includes a USB interface 1052 for receiving data from and transmitting data to a USB drive connected to the USB port 1012. For example, the USB port can be used to update the belt splicing apparatus 1000 with new recipes.

With reference to FIG. 23, the splice press 10 may have a variety of different embodiments including versions with different lengths. These versions include 600, 900, 1200, 1500, 1800, and 2100 with the version number generally corresponding to the working length of the splice press 10. For example, the splice press 10 disclosed in FIG. 1 is considered a 1200 press. FIG. 23 includes a table 611 that provides a summary of the different modes of operation of each of the different versions of the splice press 10. Each column represents a different version of the splice press 10. The modes of operation are dependent on the standard power supply connected to the splice press 10, as shown by the different rows. The modes of operation include whether the heating elements 1023/1024 and 1073/1074 are placed in series or parallel and whether the power supply circuit 50 alternately energizes the upper and lower heaters 42, 44.

With reference to FIG. 24, the power supply circuit 50 is configured to provide different heating of the upper and lower platens 46, 48 during warm-up of the platens 46, 48 in response to the standard power supply. The power supply circuit 50 is further configured to provide a dwell during the splicing operation that is based at least in part on dwell characteristics, such as dwell time, dwell temperatures of the upper and lower platens 46, 48, pressure applied by the bladders 96, 98, that are utilized regardless of the standard power supply available such that, for a given conveyor belt, a single recipe needs to be selected by a user. This makes the splice press 10 more intuitive and easy to use. The dwell stage of a splicing operation is primarily for soaking heat into the belt ends 20, 22 after the platens 46, 48 reach the predetermined dwell temperature. In general, the thicker the belt, the longer the dwell time. During the dwell stage, the material of the fingers (see FIG. 2) of one of the belt ends 20, 24 begins to flow and joins with the material of the fingers of the other belt ends 20, 24.

FIG. 24 contains two graphs, with graph 2250 showing the average temperature profile of the platens 46, 48 during a splicing operation when the splice press 10 is connected to a low power, 110 volt standard power supply. FIG. 24 also contains graph 2200 showing the temperature profile of the platens 46, 48 when the splice press 10 is connected to a higher power, 230 volt standard power supply. The temperature in FIG. 24 is shown in Celsius and the time is measured in minutes and seconds. As used herein, the terms high power standard supply and low power standard power supply are used to refer to the relative electrical power provided by different standard power supplies. Whether a standard power supply is high power or low power depends on the splice press itself. For example and with reference to FIG. 23, the splice press 12 may be a 900 version and the splice press 3000 discussed below may be a 2100 version. While a single phase, 230 volt, 16 amp standard power supply may be a high power standard power supply for the 900 version, the single phase, 230 volt, 16 amp standard power supply may be a low power standard power supply for the 2100 version. Further, a three phase, 400 volt standard power supply may be a high power standard power supply for the 2100 version while the 900 version is not configured to receive power from such a power source.

For the graph 2250, the main controller 1050 causes the power controllers 1030, 1080 to alternately energize the heaters 42, 44, i.e., one after the other, during a warm-up mode or stage 2254 of operation when the cord 600 is connected to the 110 volt standard power supply. For the graph 2200, however, the main controller 1050 causes the power controllers 1030, 1080 to energize both of the heaters 42, 44 continuously and at the same time during a warm-up mode or stage 2200A when the cord 600 is connected to the 230 volt power standard power supply. In one approach, the main controller 1050 may determine whether to utilize the alternating powering of the heaters 42, 44 or the simultaneous powering of the heaters 42, 44 in response to the result of the binary code look-up procedure discussed above with respect to FIGS. 22 and 23. In one approach, the available number of Watts determine whether the power supplied to the power supply circuit 50 is high or low.

In one form, the main controller 1050 includes a microcontroller that alternates energizing the heaters 42, 44 by adjusting the solid state relays 1041, 1091 which control power to the heaters 42, 44. The adjusting of the relays causes more power to flow to one of the heaters 42, 44 than the other. In one approach, alternating the heaters 42, 44 involves providing power to the heater 42 while not providing power to the heater 44, then providing power to the heater 44 while not providing power to the heater 42. In other words, one heater 42 is turned off while the other heater 44 is turned on. As an example, the heater 42 may be energized for two seconds while the heater 44 is turned off for those two seconds, then the heater 44 is energized for two seconds while the hater 42 is turned off for those two seconds.

In another approach, the alternating of energizing the heaters 42, 44 may involve providing a higher percentage (such as 90 percent) of the available power to one heater 42, 44 while, at the same time, providing a smaller percentage (such as ten percent) of the available power to the other heater 42, 44. In this manner, the both heaters 42, 44 are being energized but one is being energized more than the other.

Returning to FIG. 24, the operation of the splice press 10 includes the warm-up stages 2200A, 2254 until the platens 46, 48 reach critical temperatures 2202, 2260. Due to the lower power available to the splice press 10 when the splice press is connected to the 110 volt standard power supply, i.e., graph 2250, platens 46, 48 take longer to reach the critical temperature 2260 as the main controller 1050 alternates between energizing the heater 42 and the heater 44. When the splice press 10 is connected to the 230 volt standard power supply, there is more power available to the splice press 10 such that the platens 46, 48 reach the critical temperature 2202 faster. Because the main controller 1050 can alternately energize the heaters 42, 44 when the splice press 10 is connected to a low power standard power supply, the splice press 10 can still raise the platens 46, 48 to a dwell temperature 2264 which causes the material of the belt ends 20, 22 to melt despite the lower power available.

With reference to FIG. 24, the temperature of the platens 46, 48 begins at a starting temperature 2201, 2252 and increases until reaching critical temperature 2202, 2260, which is the same for both graphs 2200, 2250, e.g., 170 degrees Celsius. Once the critical temperature 2260 is reached in graph 2250, the main controller 1050 continues alternately energizing the upper and lower heaters 42, 44 to heat the upper and lower platens 46, 48 at a rate 2262. By contrast, in graph 2200 the main controller 1050 energized both the upper and lower heaters 42, 44 together prior to the platens 46, 48 reaching the critical temperature 2202 (hence the faster rate of heating than graph 2250). Once the critical temperature 2202 is reached in graph 2200, the main controller 1050 begins to alternately energize the upper and lower heaters 42, 44. This causes the platens 46, 48 to heat at a slower rate 2202A than in the warm-up stage 2200A. Moreover, the main controller 1050 operates the upper and lower heaters 42, 44 to cause the rate 2202A to be approximate the rate 2262. Besides alternating energizing the upper and lower heaters 42, 44, the main controller 1050 may also reduce the duration of each energization of the upper and lower heaters 42, 44 to compensate for the higher power standard power supply and provide the similar rates 2202A, 2262.

With reference to FIG. 25, the similarity in rates 2262 and 2202A is shown by the "heat up time (170-180)" being 34 seconds for the 110 volt single phase and 29 seconds for the 230 volt single phase. By making the rates 2262 and 2202A similar, the melting of the belt end material that begins at the dwell temperature 2203, 2264 is more consistent and independent of the standard power supply available.

The main controller 1050 continues to alternate between powering the upper and lower heaters 42, 44 in both the low power graph 2250 and the high power graph 2200 until the platens reach the dwell temperature 2203, 2264 which is the same for both graphs 2200, 2250, e.g., 180 degrees Celsius. The main controller 1050 continues to alternate between powering the upper and lower heaters 42, 44 as necessary to maintain the upper and lower platens 46, 48 at the dwell temperature 2203, 2264 for the dwell time 2207, 2256, which is the same for both graphs 2200, 2250, e.g., 1 minute. In one approach, the dwell mode or stage lasts from when the platens 46, 48 reach temperatures 2203, 2264, for the dwell times 2207, 2256, and ends at temperatures 2205, 2268. In some approaches, the temperature of the platens 46, 48 may vary during the dwell times 2207, 2256. The power supply circuit 50 may utilize a feedback loop using temperature sensors 1047, 1048 (see FIGS. 21B and 21C) to determine when to energize the upper and lower heaters 42, 44.

With continued reference to FIG. 24, the main controller 1050 maintains the platens 46, 48 at the dwell temperatures 2203, 2264 for the dwell time 2207, 2256 set by the recipe until dwell end points 2205, 2268 are reached and the heaters 42, 44 are turned off. At this point, the cool-down stage 2200D, 2258 starts. During the cool-down stages 2200D, 2258, the main controller 1050 causes the power controllers 1030, 1080 to energize the fan circuits 1043, 1093 and operate the fan assemblies 78, 174 to reduce the temperature of the platens 46, 48.

As noted above, FIG. 24 provides the graph 2200 of temperature of the platens 46, 48 during a splice operation when the cord 600 is connected to a high power standard power supply. For example, a user may have selected the cord 600 configured to be connected to three phase, 230 volt, 16 amp standard power supply. The connector 602 of this cord 600 includes the electrical contacts 1006 (see FIGS. 16 and 21D). Once the user connects the connector 602 to the connector 606 of the lower press assembly 12 and powers up the splice press 10, the main controller 1050 uses the lookup table of FIG. 23 and the binary code provided by the connector 602 to determine the phase, voltage, and current rating of the standard power supply.

As discussed above, the main controller 1050 is configured to alternate between energizing the upper and lower heaters 42, 44 during the warm-up stage when the splice press 10 is connected to a low power standard power supply, which permits the platens 46, 48 to be heated to the critical temperature despite the low power. The main controller 1050 is also configured to operate each pair of heating elements 1023, 1024 and 1073, 1074 in series or parallel during the splicing operation depending on the voltage of the standard power supply.

With reference to FIG. 25, tables 2222A, 2222B, 2222C, are provided that includes data from the graph of FIG. 24 and corresponds to a single recipe used to splice a specific belt regardless of whether the splice press 10 is connected 110 volt single phase or 230 volt single phase. As an example, the recipe for splicing a particular conveyor belt may include the information in table 2222A. The information in table 2222A includes dwell characteristics such as a dwell temperature (the temperature of the upper and lower platens 46, 48), a dwell time (how long the main controller 1050 keeps the platens 46, 48 at the dwell temperature), and pressure to be applied by the bladders 96, 98. The information in the table 2222a can also include other information such as preheat/no preheat, for example. As can be seen by reviewing FIG. 24 and table 2222A, there is a single recipe for both the 110 volt single phase (see graph 2250) and the 230 volt single phase (see graph 2200). In particular, in both modes of operation the dwell temperature for both platens 46, 48 is 180 degrees Celsius, the dwell time is one minute, the pressure applied by the bladders 96, 98 is 1.2 bar, and there is no preheat operation. In simple terms, a user may select a recipe for a particular belt and the power supply circuit 50 takes care of the rest by alternately causing heating of the platens 46, 48 if there is a low power standard power supply available and heating the plates 46, 48 simultaneously if there is a high power standard power supply available. Once the plates 46, 48 reach the dwell temperatures 2203, 2264, the power supply circuit 50 operates the heaters 42, 44 to provide the same heating profile of the platens 46, 48 during the dwell time 2207, 2256 whether there is a lower power or a high power standard power supply available. It is noted that a particular conveyor belt may be a conveyor belt made of a specific material(s) and having a specific thickness and width. As an example, for a certain thermoplastic belt material, each size belt may have a different recipe. In other approaches, the dwell temperatures for the platens 46, 48 may be different such as the dwell temperature of the upper platen 46 being higher than the dwell temperature of the lower platen 48.

Initially, the series-parallel relays 1042, 1092 are in a safe series mode with the heating elements 1023, 1024 being connected in series and the heating elements 1073, 1074 being connected in series. When the splice press 10 is connected to a high voltage standard power supply, the relays 1042, 1092 remain unpowered, resulting in the heating elements 1023, 1024 being connected in series and the heating elements 1073, 1074 being connected in series.

When the splice press 10 is connected to a low voltage standard power supply, the relays 1042, 1092 are energized. This causes the heating elements 1023, 1024 to be connected in parallel and the heating elements 1073, 1074 to be connected in parallel. This allows each heating element 1023, 1024, 1073, 1074 to experience the same, or nearly the same, voltage drop whether there is a lower voltage or higher voltage standard power supply available. As an example, the voltage drop across each of the heating elements 1023, 1024, 1073, 1074 is 110 volts when the splice press 10 is connected to a 110 volt power supply and the heating element 1023, 1024 and 1073, 1074 are in parallel as well as when the splice press 10 is connected to a 230 volt power source and the heating elements 1023, 1024 and 1073, 1074 are in series.

With reference to FIG. 23, the table 611 of different models of the splice press 10 described in the present application at different standard power supplies. The table indicates whether the apparatus can operate at a particular power and, if so, whether the heating elements 1023, 1024 and 1073, 1074 are in series or parallel during a splicing operation and if the splice press 10 needs to alternate heating between the upper and lower platens 46, 48 during warm-up. The electrical schematic of FIGS. 21-21D is representative of the 600, 900, and 1200 versions of the splice press 10 identified in table 611.

Figure 26:
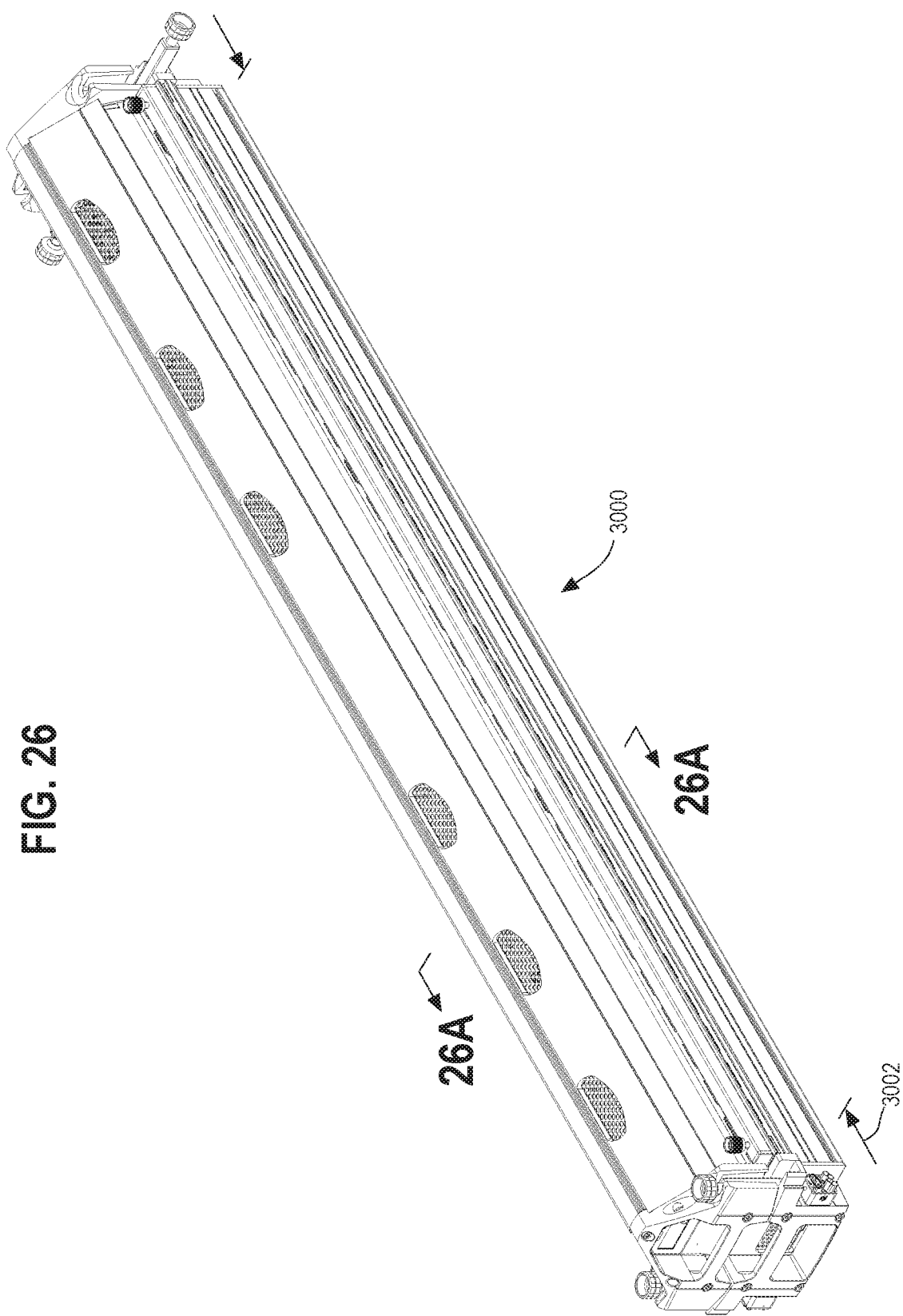
FIG. 26 is a perspective view of an another conveyor belt splicing apparatus having a longer longitudinal length for splicing wider conveyor belts.

In FIG. 26, another splice press 3000 is provided that is the 2100 version identified in the table 611 of FIG. 23. The splice press 3000 is similar in many respects to the splice press 10 discussed above. The splice press 3000 has a platen working length 3000 of approximately 2200 mm which is longer than the working length 260 of the splice press 10 discussed above.

Figure 26A:
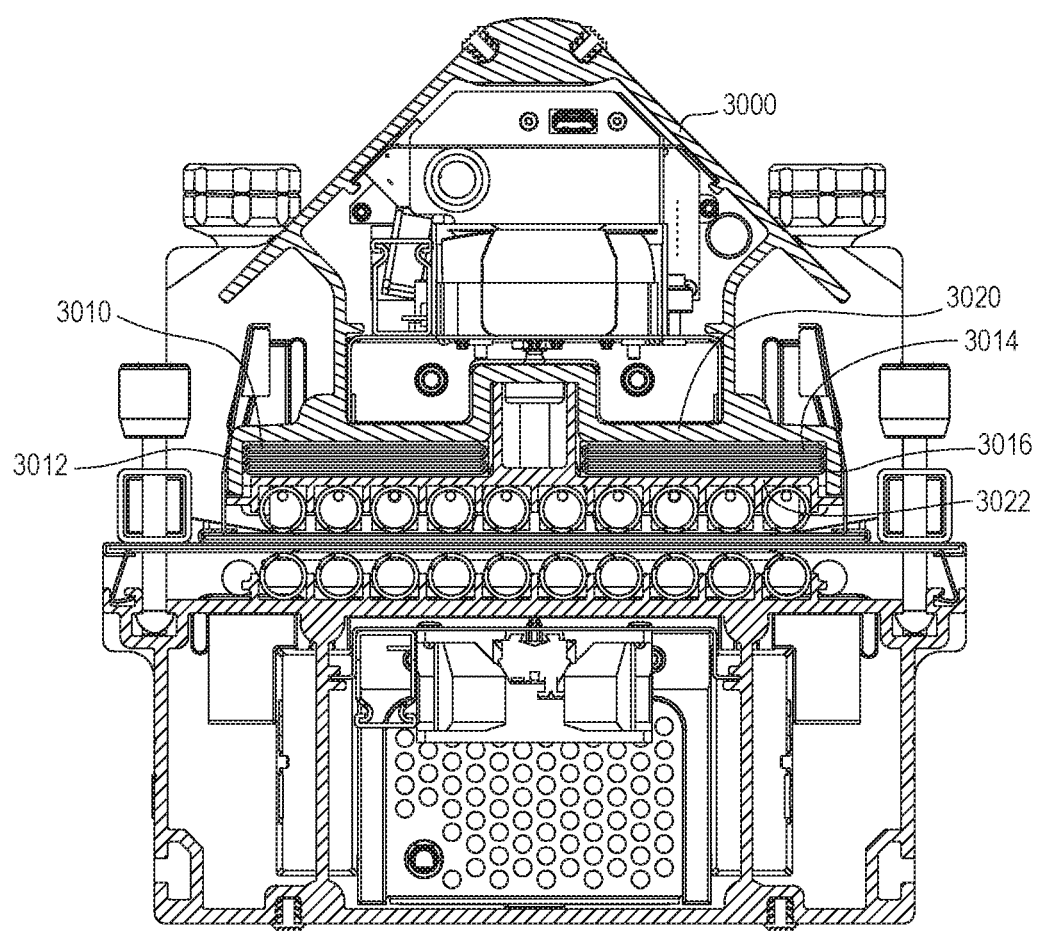
FIG. 26A is a cross-sectional view taken across line 26A-26A in FIG. 26 showing pairs of stacked bladders that can be inflated to clamp an upper platen of the conveyor belt splicing apparatus against the conveyor belt ends.

With reference to FIG. 26A, another difference between the splice presses 10, 3000 is that the splice press 3000 includes pairs of vertically stacked bladders 3010, 3012 and 3014, 3016 that can be inflated to urge apart a frame 3020 and a spring bed 3022 of the splice press 3000. In some applications, the frame 3020 of a longer splice press may deflect more in the longitudinal middle of the frames 3020 than the frame of a shorter splice press. The bladders for these longer splice presses may therefore have a longer vertical stroke than the bladders of the shorter presses. Utilizing two pairs of bladders 3010, 3012 and 3014, 3016 is advantageous for the longer splice presses because each bladder has a shorter stroke than if there were only one bladder on each side. Because each bladder has a shorter stroke, each one of the bladders 3010, 3012, 3014, 3016 is less curved in cross section than if there were only one bladder. The decreased curvature improves the distribution of pressure against the spring bed 3022 and improves splice quality by reducing hot spots that may occur along the conveyor belt ends during the splicing operation.

Figure 27:
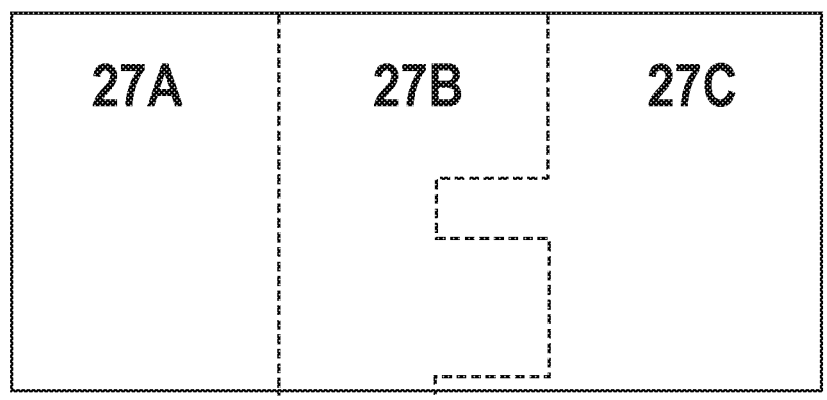
FIGS. 27, 27A, 27B, 27C, and 27D are a schematic diagram of an electrical circuit of the conveyor belt splicing apparatus of FIG. 26.
Figure 27A:
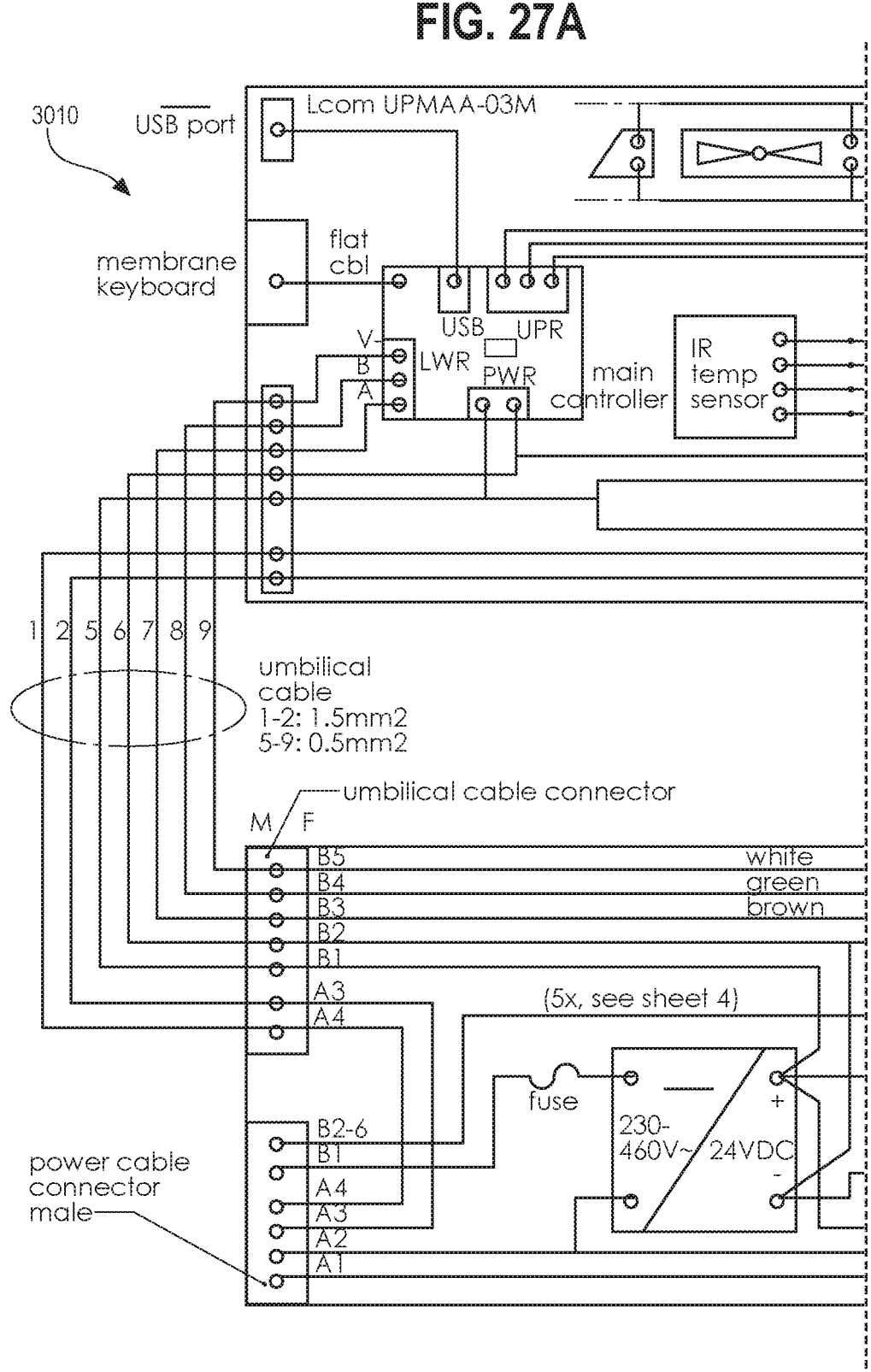
Figure 27B:
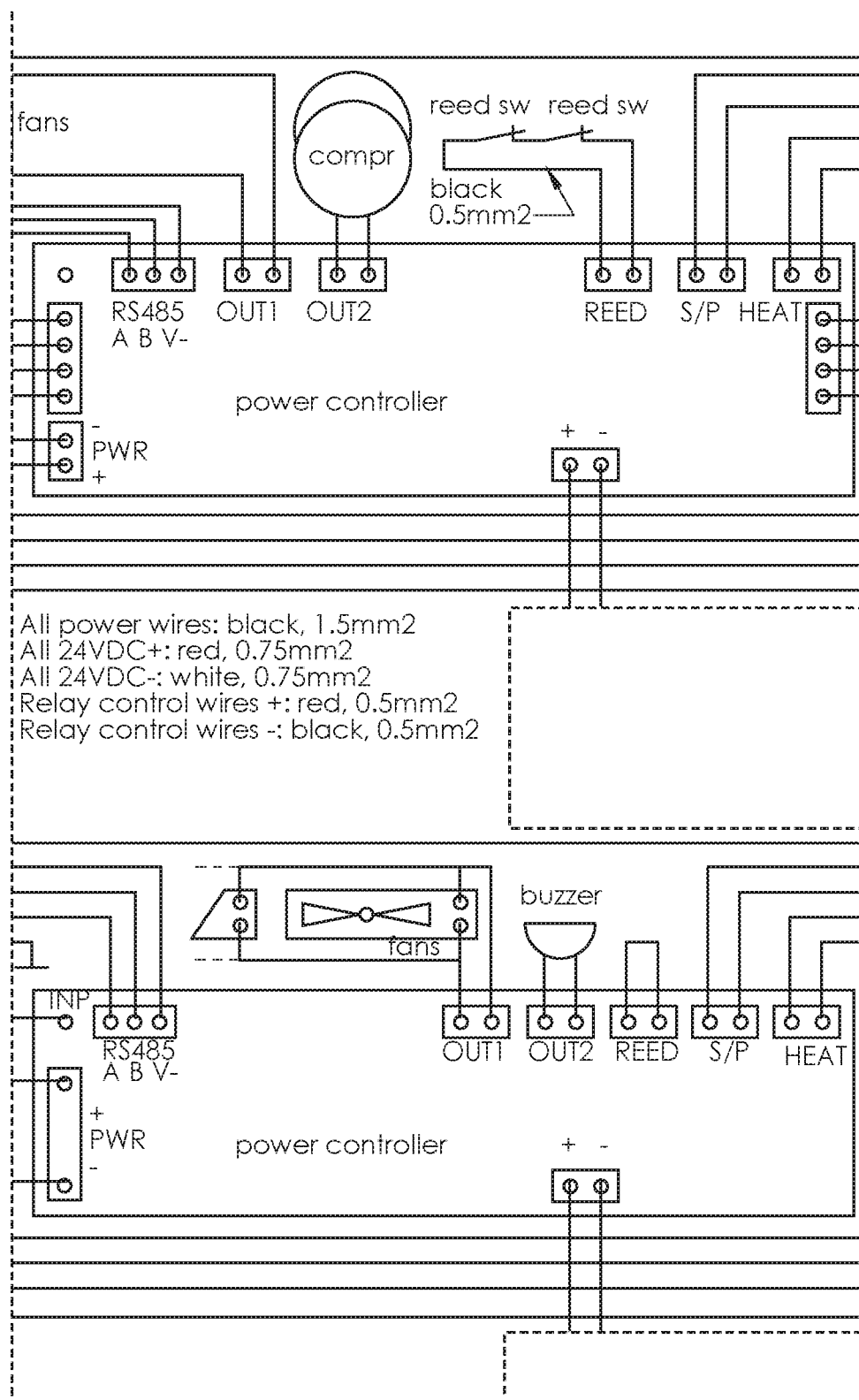
Figure 27C:
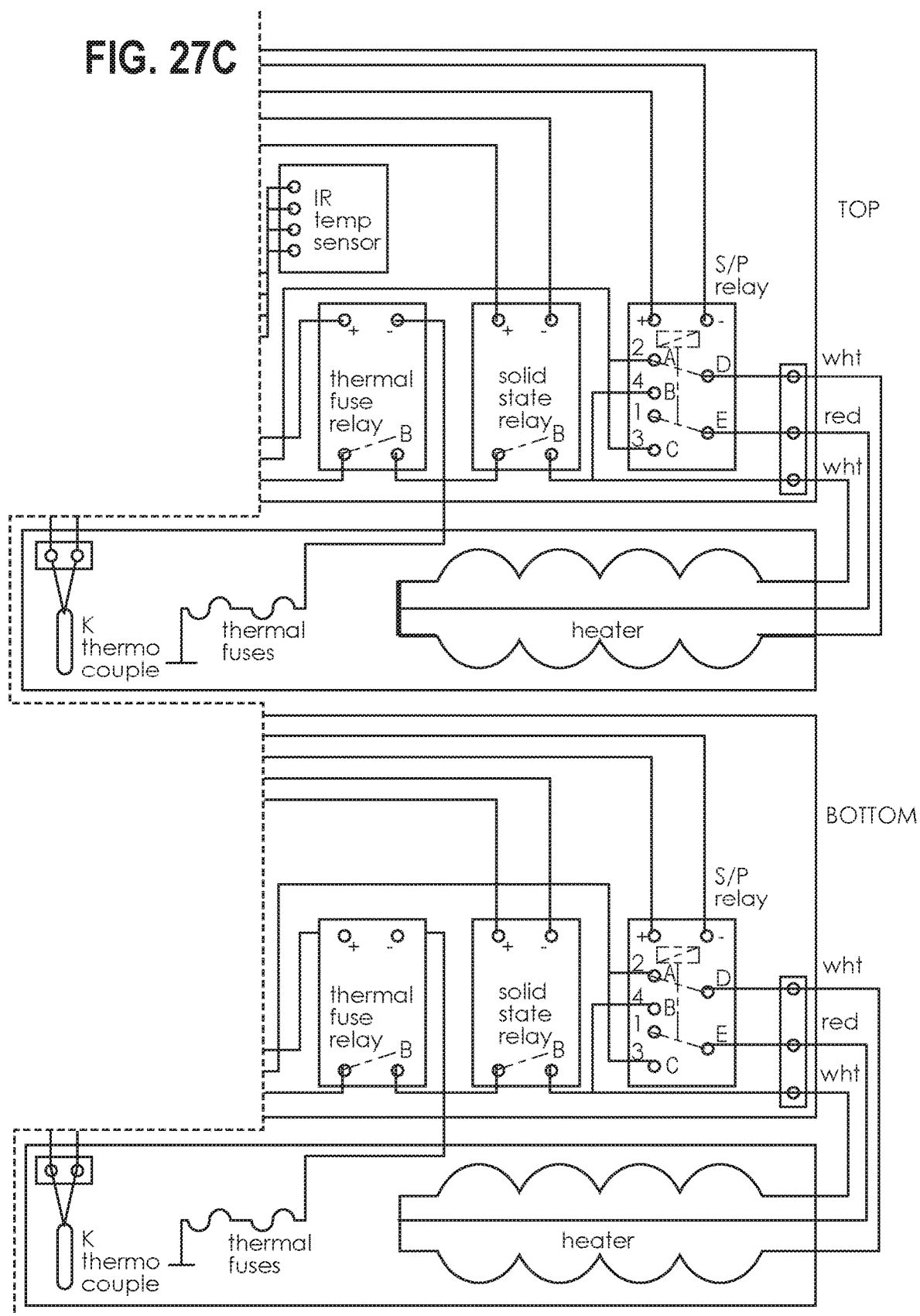
Figure 27D:
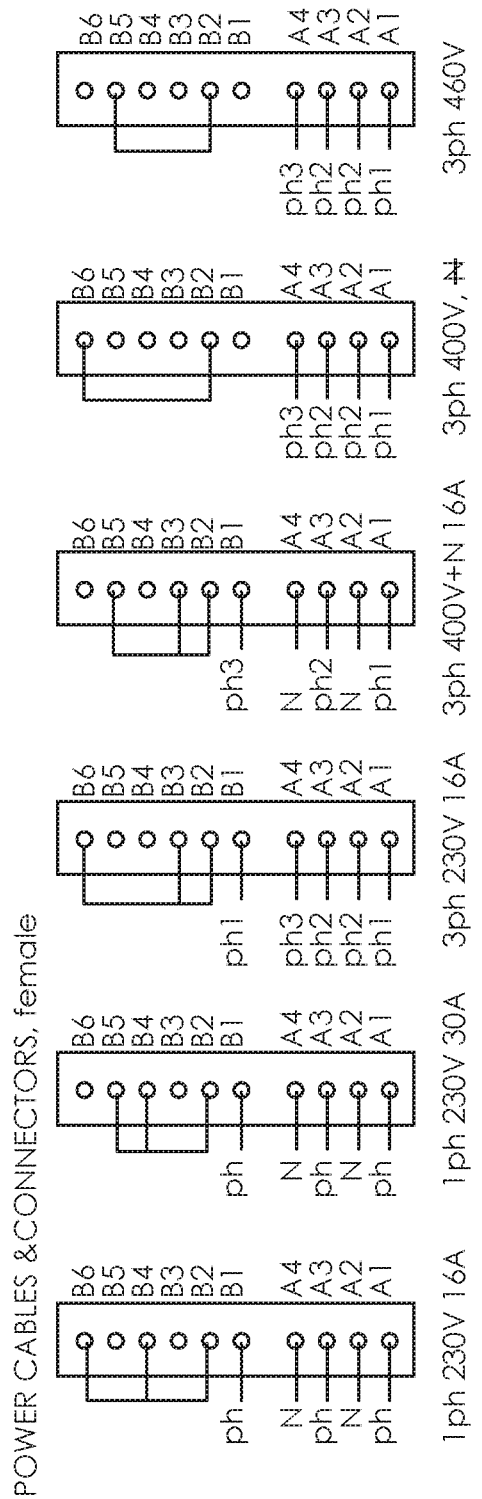

With reference to FIGS. 27, 27A, 27B, 27C, and 27D, the splice press 3000 has a power supply circuit 3010 that is similar in many respects to the power supply circuit 50 of the splice press 10. The electrical schematic for the of FIGS. 27-27D is representative of the 1500, 1800, and 2100 versions of the splice press identified above in the table 611 of FIG. 23.

Those skilled in the art will recognize that a wide variety of modifications, alterations, and combinations can be made with respect to the above-described embodiments without departing from the spirit and scope of the invention, and that such modifications, alterations, and combinations are to be viewed as being within the scope of the claims.

What is claimed is:

1. A portable conveyor belt splicing apparatus comprising:
    upper and lower platens for clamping belt ends therebetween;
    upper and lower heaters operable to heat the upper and lower platens;
    a power supply circuit operably coupled to the upper and lower heaters for energizing the upper and lower heaters to splice the belt ends, the power supply circuit adapted to be electrically connected to either one of a high power standard power supply and a low power standard power supply; and
    the power supply circuit being configured such that predetermined dwell characteristics for a belt splicing operation generated by the energized upper and lower heaters are the same regardless of whether the power supply circuit is connected to the high power standard power supply or the low power standard power supply,
    wherein the power supply circuit is configured to alternate between providing more power to the upper heater than the lower heater and providing more power to the lower heater than the upper heater during a warm-up stage of the belt splicing operation in response to the power supply circuit being connected to the low power standard power supply.

2. The conveyor belt splicing apparatus of claim 1 wherein the power supply circuit is configured to operate the upper and lower heaters according to a first warm-up mode in response to the power supply being connected to the high power standard power supply and the power supply circuit is configured to operate the upper and lower heaters according to a different, second warm-up mode in response to the power supply being connected to the low power standard power supply.

3. The conveyor belt splicing apparatus of claim 2 wherein the first warm-up mode lasts for a first time period and the second warm-up mode lasts for a second time period that is longer than the first time period.

4. The conveyor belt splicing apparatus of claim 1 wherein the power supply circuit is further configured to energize the upper heater and the lower heater together during a warm-up stage of the belt splicing operation in response to the power supply circuit being connected to the high power standard power supply.

5. The conveyor belt splicing apparatus of claim 1 wherein the power supply circuit is configured to provide more power to the upper heater than the lower heater by providing power to the upper heater and not providing power to the lower heater, the power supply circuit being further configured to provide more power to the lower heater than the upper heater by providing power to the lower heater and not providing power to the upper heater.

6. The conveyor belt splicing apparatus of claim 1 further comprising at least one cord for connecting the power supply circuit to the high power standard power supply and the low power standard power supply, the power supply circuit being configured to determine whether the power supply circuit is connected to the high power standard power supply or the low power standard power supply based at least in part on the at least one cord.

7. The conveyor belt splicing apparatus of claim 1 wherein the power supply circuit is adapted to be connected to a high power standard power supply providing one of the following power supplies: single phase, 230 volt, 16 amp; single phase, 230 volt, 30 amp; three phase, 230 volt, 16 amp; and three-phase, 400volt, 16 amp; and
    the power supply circuit is adapted to be connected to a low power standard power supply providing one of the following power supplies: single phase, 110 volt, 15 amp; single phase, 110 volt, 20 amp; and single phase, 230 volt, 10 amp.

8. The conveyor belt splicing apparatus of claim 1 wherein the power supply circuit is adapted to be connected to a high power standard power supply providing one of the following power supplies: single phase, 230 volt, 30 amp; three phase, 400 volt, 16 amp; three phase, 400 volt; three phase, 460 volt; and
    the power supply circuit is adapted to be connected to a low power standard power supply providing one of the following power supplies: single phase, 230 volt, 16 amp; and three phase, 230 volt, 16 amp.

9. The conveyor belt splicing apparatus of claim 1 wherein the power supply circuit is configured to operate the upper and lower heaters according to a first warm-up mode in response to the power supply being connected to the high power standard power supply and the power supply circuit is configured to operate the upper and lower heaters according to a different, second warm-up mode in response to the power supply being connected to the low power standard power supply, wherein the first warm-up mode lasts for a first time period and the second warm-up mode lasts for a second time period that is longer than the first time period.

10. A portable conveyor belt splicing apparatus comprising:

upper and lower platens for clamping belt ends therebetween;

upper and lower heaters operable to heat the upper and lower platens;

a power supply circuit operably coupled to the upper and lower heaters for energizing the upper and lower heaters to splice the belt ends, the power supply circuit adapted to be electrically connected to either one of a high power standard power supply and a low power standard power supply; and the power supply circuit being configured such that predetermined dwell characteristics for a belt splicing operation generated by the energized upper and lower heaters are the same regardless of whether the power supply circuit is connected to the high power standard power supply or the low power standard power supply, wherein the power supply circuit is configured to alternate between providing more power to the upper heater than the lower heater and providing more power to the lower heater than the upper heater during a dwell stage of the belt splicing operation regardless of whether the power supply circuit is connected to the high power standard power supply or the low power standard power supply.

11. The conveyor belt splicing apparatus of claim 10 wherein the dwell characteristics include a dwell time such that the upper and lower platens are heated for a dwell time that is the same regardless of whether the power supply circuit is connected to the high power standard power supply or the low power standard power supply.

12. The conveyor belt splicing apparatus of claim 10 wherein the dwell characteristics include dwell temperatures for the upper and lower platens such that the upper and lower platens each have a dwell temperature that is the same regardless of whether the power supply circuit is connected to the high power standard power supply or the low power standard power supply.

13. The conveyor belt splicing apparatus of claim 10 further comprising an air pump and at least one inflatable bladder connected to the air pump; and the dwell characteristics include a dwell pressure and the power supply circuit is configured to control operation of the air pump to inflate the at least one bladder and apply the dwell pressure to the belt ends that is the same whether the power supply circuit is connected to the high power standard power supply or the low power standard power supply.

14. The conveyor belt splicing apparatus of claim 10 wherein the power supply circuit is configured to provide a predetermined power to one of the upper and lower heaters during a high-power portion of the dwell stage of the belt splicing operation, the power supply circuit configured to provide a power less than the predetermined power to the one of the upper and lower heaters during a low-power portion of the dwell stage of the belt splicing operation, wherein the power supply circuit is configured to provide the power less than the predetermined power to the one of the upper and lower heaters during the low-power portion of the dwell stage by not providing power to the one of the upper and lower heaters.

15. The conveyor belt splicing apparatus of claim 10 wherein the dwell characteristics include a dwell time such that the upper and lower platens are heated for a dwell time that is the same regardless of whether the power supply circuit is connected to the high power standard power supply or the low power standard power supply; and wherein the dwell characteristics include dwell temperatures for the upper and lower platens such that the upper and lower platens each have a dwell temperature that is the same regardless of whether the power supply circuit is connected to the high power standard power supply or the low power standard power supply.

16. A method of splicing ends of a conveyor belt between a pair of platens of a portable conveyor belt splicing apparatus, the method comprising:

receiving electrical power at a power supply circuit of the conveyor belt splicing apparatus from either one of a high power standard power supply or a low power standard power supply;

energizing heaters operably coupled to the power supply circuit to heat the platens and splice the conveyor belt ends such that predetermined dwell characteristics generated by the heaters are the same regardless of whether the power supply circuit receives electrical power from the high power standard power supply or the low power standard power supply, wherein receiving electrical power at the power supply circuit of the conveyor belt splicing apparatus includes receiving power from the low power standard power supply; and energizing the heaters to heat the platens and splice the conveyor belt ends includes alternating between providing more power to one heater than the other heater and providing more power to the other heater than the one heater during a warm-up stage of a splicing operation.

17. The method of claim 16 wherein providing more power to the one heater than the other heater includes providing power to the one heater and not providing power to the other heater, and providing more power to the other heater than the one heater includes providing power to the other heater and not providing power to the one heater.

18. The method of claim 16 wherein the power supply circuit determines whether the power supply circuit receives electrical power from the high power standard power supply or the low power standard power supply based at least in part on an electrical cord electrically connecting the power supply circuit to the standard power supply.

19. A method of splicing ends of a conveyor belt between a pair of platens of a portable conveyor belt splicing apparatus, the method comprising:

receiving electrical power at a power supply circuit of the conveyor belt splicing apparatus from either one of a high power standard power supply or a low power standard power supply;

energizing heaters operably coupled to the power supply circuit to heat the platens and splice the conveyor belt ends such that predetermined dwell characteristics generated by the heaters are the same regardless of whether the power supply circuit receives electrical power from the high power standard power supply or the low power standard power supply, wherein energizing the heaters to heat the platens and splice the conveyor belt ends includes alternating between providing more power to one heater than the other heater and providing more power to the other heater than the one heater during a dwell stage of a splicing operation regardless of whether the power supply circuit receives electrical power from the high power standard power supply or the low power standard power supply.

20. The method of claim 19 wherein the dwell characteristics include a dwell time and energizing the heaters includes energizing the heaters so that the platens are heated for a dwell time that is the same regardless of whether the power supply circuit receives electrical power from the high power standard power supply or the low power standard power supply.

21. The method of claim 19 wherein the dwell characteristics include dwell temperatures for the platens and energizing the heaters includes energizing the heaters so that the platens each have a dwell temperature that is the same regardless of whether the power supply circuit receives electrical power from the high power standard power supply or the low power standard power supply.

22. The method of claim 19 wherein the dwell characteristics include a dwell pressure; and
inflating at least one bladder to apply the dwell pressure to the belts ends that is the same whether the power supply circuit receives electrical power from the high power standard power supply or the low power standard power supply.

23. The method of claim 19 wherein energizing the heaters to heat the platens and splice the conveyor belt ends includes energizing the heaters according to a first warm-up mode in response to the power supply circuit receiving power from the high power standard power supply or operating the heaters according to a second warm-up mode in response to the power supply circuit receiving power from the low power standard power supply.

24. The method of claim 23 wherein the first mode lasts for a first time period and the second warm-up mode lasts for a second time period that is longer than the first time period.

25. The method of claim 19 wherein receiving electrical power at the power supply circuit of the conveyor belt splicing apparatus includes receiving power from a high power standard power supply providing: single phase, 230 volt, 16 amp; single phase, 230 volt, 30 amp; three phase, 230 volt, 16 amp; or three-phase, 400 volt, 16 amp.

26. The method of claim 19 wherein receiving electrical power at the power supply circuit of the conveyor belt splicing apparatus includes receiving power from a low power standard power supply providing: single phase, 110 volt, 15 amp; single phase, 110 volt, 20 amp; or single phase, 230 volt, 10 amp.

27. The method of claim 19 wherein receiving electrical power at the power supply circuit of the conveyor belt splicing apparatus includes receiving power from a high power standard power supply providing: single phase, 230 volt, 30 amp; three phase, 400 volt, 16 amp; three phase, 400 volt; or three phase, 460 volt.

28. The method of claim 19 wherein receiving electrical power at the power supply circuit of the conveyor belt splicing apparatus includes receiving power from a low power standard power supply providing: single phase, 230 volt, 16 amp; or three phase, 230 volt, 16 amp.

* * * * *